United States Patent
Yamauchi et al.

(10) Patent No.: US 6,829,134 B2
(45) Date of Patent: Dec. 7, 2004

(54) LAMINATED CERAMIC ELECTRONIC COMPONENT AND METHOD FOR MANUFACTURING THE SAME

(75) Inventors: Makoto Yamauchi, Fukui-ken (JP); Akihiro Shimizu, Fukui (JP); Kazuaki Kawabata, Fukui (JP); Hiroaki Taira, Izumo (JP); Hiroyuki Matsumoto, Izumo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/615,009

(22) Filed: Jul. 8, 2003

(65) Prior Publication Data

US 2004/0027787 A1 Feb. 12, 2004

(30) Foreign Application Priority Data

Jul. 9, 2002 (JP) ........................... 2002-199816
Nov. 28, 2002 (JP) ........................... 2002-346116
Jan. 27, 2003 (JP) ........................... 2003-017775

(51) Int. Cl.[7] ............................................ H01G 4/005
(52) U.S. Cl. ................. 361/303; 361/306.1; 361/306.3; 361/321.2; 361/311; 361/313
(58) Field of Search ............................ 361/303, 306.1, 361/306.3, 308.1, 309, 310, 311, 313, 320, 321.2, 321.5, 301.4, 302, 321.3

(56) References Cited

U.S. PATENT DOCUMENTS 4,513,350 A * 4/1985 Coleman ................. 361/321.2
6,061,227 A * 5/2000 Nogi ........................... 361/303
6,072,687 A * 6/2000 Naito et al. ................. 361/303
6,104,599 A * 8/2000 Ahiko et al. ............. 361/306.3
2004/0027735 A1 * 2/2004 Hsieh et al. ................... 361/15

FOREIGN PATENT DOCUMENTS

| JP | 56-91433 | 12/1979 |
|---|---|---|
| JP | 56-71919 | 6/1981 |
| JP | 4-92624 | 8/1992 |
| JP | 08-097071 | 4/1996 |
| JP | 11-097284 | 4/1999 |
| JP | 2000-124064 | 4/2000 |
| JP | 2000-277380 | 10/2000 |

* cited by examiner

Primary Examiner—Dean A. Reichard
Assistant Examiner—Nguyen T. Ha
(74) Attorney, Agent, or Firm—Keating & Bennett, LLP

(57) ABSTRACT

A highly reliable monolithic ceramic capacitor which has no structural defect, e.g. peeling, and which is not susceptible to water from the outside and a method for manufacturing the same are provided. A lead portion of an internal electrode is configured to have a shape provided with a taper-shaped portion in which the width gradually decreases with increasing proximity to the end surface of a ceramic element, and the shape of the end portion opposite to the lead portion of the internal electrode is adjusted to be substantially rectangular. Regarding a pair of internal electrodes facing each other with the ceramic layer therebetween, the internal electrodes are laminated while the positions thereof are displaced with respect to each other in order that a corner portion in the substantially rectangular portion of one internal electrode are located in the vicinity of, but outside the taper-shaped portion of the other internal electrode.

15 Claims, 21 Drawing Sheets

LAMINATED CERAMIC ELECTRONIC COMPONENT AND METHOD FOR MANUFACTURING THE SAME

BACKGROUND OF THE INVENTION

1. Field of the Invention

The present invention relates to a laminated ceramic electronic component including a plurality of internal electrodes which are laminated with a ceramic layer therebetween, and the internal electrodes facing each other are alternately led out to the end surfaces on the opposite sides of the ceramic element such that the internal electrodes are connected to external electrodes provided on the end surfaces, and also relates to a method for manufacturing the same.

2. Description of the Related Art

In a monolithic ceramic capacitor, for example, as shown in FIG. 18, a plurality of internal electrodes 52 are laminated with a ceramic layer 53 therebetween in a ceramic element 51. The internal electrodes 52 are alternately led out to the end surfaces on the opposite sides of the ceramic element 51. The internal electrodes 52 are connected to external electrodes 54 provided on the end surfaces.

In general, the monolithic ceramic capacitor having the above-described structure is manufactured as described below. For example, as shown in FIG. 19, ceramic green sheets 53a, each provided with an internal electrode pattern 52a on the surface through the application of a conductive paste by a screen printing method or other suitable method, are laminated. Ceramic green sheets (dummy sheets) 53b provided with no internal electrode are laminated on the top and bottom surfaces, followed by pressure bonding and firing. A conductive paste is applied to both end surfaces of the fired laminate (ceramic element) 51, followed by baking, such that a pair of external electrodes 54 (FIG. 18) are formed.

In the monolithic ceramic capacitor having the above-mentioned structure, water may enter into the interior of the ceramic element 51 from exposed portions of the internal electrodes 52 on the end surfaces, and thereby, characteristics of the capacitor may be degraded and peeling may occur.

In order to overcome the above-described problems, as shown in FIGS. 20A and 20B, a monolithic ceramic capacitor is proposed, in which the width W of a lead portion 55 of the internal electrode 52 is less than the width $W_0$ of another portion (capacitance-forming portion) 56 in order to prevent the entrance of water from outside and the occurrence of peeling (Japanese Unexamined Patent Application Publication No. 8-97071 and Japanese Unexamined Patent Application Publication No. 11-97284).

However, in the monolithic ceramic capacitor in which the width W of the lead portion 55 is reduced, as shown in FIG. 21, thicknesses of the internal electrodes 52 are increased at the corner portions (regions A in FIG. 20B) of the internal electrode 52 (capacitance-forming portion 56), boundary portions (regions B in FIG. 20B) between the lead portion 55 and the capacitance-forming portion 56 and other portions, and thereby, an internal stress is generated when lamination is performed. As a result, problems occur in that the thermal shock resistance is degraded, and thereby, cracks occur so as to cause degradation of the characteristics. In particular, when an internal electrode pattern is formed through printing of a conductive paste by a screen printing method, the thickness of the internal electrode 52 is likely to be increased at the above-mentioned corner portions A and the boundary portions B, and thereby, problems occur in that the internal stress is increased and the thermal shock resistance is degraded.

SUMMARY OF THE INVENTION

To overcome the above-described problems, preferred embodiments of the present invention provide a highly reliable monolithic ceramic capacitor which has no structural defect, e.g. peeling, and which is not susceptible to water from the outside, and to provide a method for manufacturing such a novel monolithic ceramic capacitor.

Preferred embodiments of the present invention provide the following configuration and manufacturing method.

A laminated ceramic electronic component according to a preferred embodiment of the present invention includes a plurality of internal electrodes that face each other with a ceramic layer therebetween and that are provided in a ceramic element, and the internal electrodes facing each other extend to respective end surfaces of a pair of end surfaces of the ceramic element through respective lead portions continued from the respective internal electrode main portions such that the internal electrodes are connected to respective external electrodes of a pair of the external electrodes provided on the pair of end surfaces, wherein each internal electrode of a pair of internal electrodes has a two-dimensional shape including at least one corner portion in the main portion and a portion having a width that gradually decreases in one direction in a portion that extends from the main portion, and wherein the pair of internal electrodes are arranged such that a corner portion of one internal electrode of the pair of the internal electrodes and a portion of the other internal electrode having a width gradually decreasing in one direction are in close proximity to each other with the ceramic layer therebetween while the corner portion of the one internal electrode does not overlap the other internal electrode, or such that a corner portion of the other internal electrode and a portion of the one internal electrode having a width gradually decreasing in one direction are in close proximity to each other with the ceramic layer therebetween while the corner portion of the other internal electrode does not overlap the one internal electrode.

In the above-mentioned laminated ceramic electronic component, the portion having a width that gradually decreases in one direction is preferably in the lead portion of the internal electrode, and the corner portion is preferably located in a portion opposite to the lead portion with the center of the internal electrode main portion therebetween.

In a preferred embodiment of the laminated ceramic electronic component, the width of the portion having a width gradually decreasing in one direction preferably decreases linearly.

In a preferred embodiment of the laminated ceramic electronic component, the width of the portion having a width gradually decreasing in one direction preferably decreases at an angle of about 40 to about 80 degrees.

In a preferred embodiment of the above-mentioned laminated ceramic electronic component, the width of the portion having a width gradually decreasing in one direction more preferably decreases at an angle of about 60 to about 80 degrees.

In a preferred embodiment of the above-mentioned laminated ceramic electronic component, the external electrode-side width in the portion having a width gradually decreasing in one direction is preferably about two-thirds to about three-quarters the width of the internal electrode main portion.

A method for manufacturing a laminated ceramic electronic component having the above-mentioned structure includes the steps of applying a conductive paste on one surface of a ceramic green sheet via a screen printing method to provide an electrode pattern having the above-mentioned shape on the ceramic green sheet surface and laminating a plurality of the ceramic green sheets such that a pair of internal electrodes facing each other with the ceramic layer therebetween have the above-mentioned positional relationship.

In a preferred embodiment of manufacturing a laminated ceramic electronic component, the internal electrode preferably includes a corner portion that located in a portion at which two sides of the internal electrode main portion are in contact with each other, and the portion having a width gradually decreasing in one direction is located in the lead portion.

In the above-mentioned laminated ceramic electronic component, each internal electrode of a pair of the internal electrodes preferably has a two-dimensional shape with at least one of a curve and a chamfering straight line in each of four corner portions, and in a pair of the internal electrodes, the length of one of the curve and the chamfering straight line in one corner portion of the one internal electrode may be different from the length of one of a curve and a chamfering straight line in the portion facing the corner portion and having a width that gradually decreases in one direction in the other internal electrode.

In the above-mentioned laminated ceramic electronic component, one of the corner portions is preferably located in the end portion opposite to the lead portion in the internal electrode.

In a preferred embodiment of the laminated ceramic electronic component, the length of the curve or the chamfering straight line in one corner portion of the other internal electrode is preferably different from the length of the curve or the chamfering straight line in the portion facing the corner portion and having a width gradually decreasing in one direction in the one internal electrode.

In another preferred embodiment of the laminated ceramic electronic component, the width of the portion having a width gradually decreasing in one direction preferably decreases linearly at an angle of 40 to 80 degrees.

In another preferred embodiment of the laminated ceramic electronic component, the width of the portion having a width gradually decreasing in one direction more preferably decreases linearly at an angle of 60 to 80 degrees.

In a further preferred embodiment of the laminated ceramic electronic component, the external electrode-side width in the portion having a width gradually decreasing in one direction is preferably about two-thirds to about three-quarters the width of the internal electrode main portion.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 1A is a perspective view showing the shape of a pair of internal electrodes, and FIG. 1B is a plan view showing the overlapping state of a pair of the internal electrodes.

FIG. 4A is a perspective view showing the shape of a pair of internal electrodes, and FIG. 4B is a plan view showing the overlapping state of a pair of the internal electrodes.

FIG. 14A is a perspective view showing the shape of a pair of internal electrodes, and FIG. 14B is a plan view showing the overlapping state of a pair of the internal electrodes.

FIG. 17A is a perspective view showing the shape of a pair of internal electrodes, and FIG. 17B is a plan view showing the overlapping state of a pair of the internal electrodes.

FIG. 20A is a perspective view showing the shape of a pair of internal electrodes, and FIG. 20B is a plan view showing the overlapping state of a pair of the internal electrodes.

DETAILED DESCRIPTION OF PREFERRED EMBODIMENTS

Figure 1A:
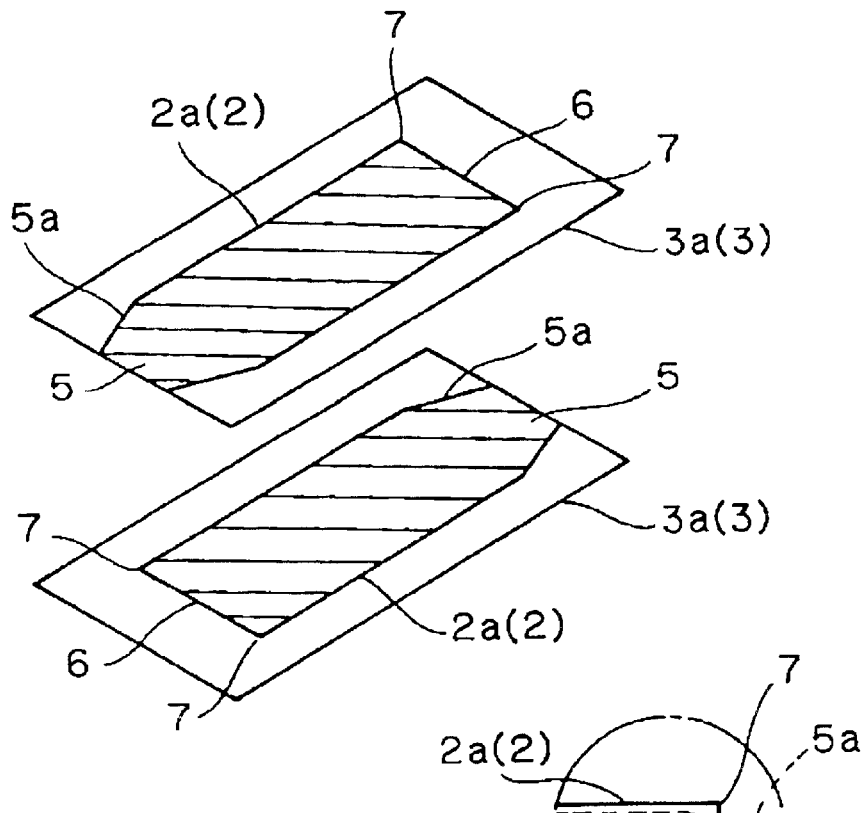
FIGS. 1A and 1B are diagrams showing internal electrodes defining a monolithic ceramic capacitor according to a preferred embodiment of the present invention.

The present invention specifically includes the following manufacturing method (1-1) and structural configuration (1-2).

(1-1): A method for manufacturing a laminated ceramic electronic component according to a preferred embodiment of the present invention includes the step of laminating ceramic green sheets, while each ceramic green sheet is provided with an internal electrode pattern on the surface thereof made of a conductive paste by a screen printing method. The resulting laminated ceramic electronic component includes a plurality of internal electrodes facing each other with a ceramic layer therebetween in a ceramic element, and the internal electrodes facing each other are alternately led out to opposed end surfaces of the ceramic element such that the internal electrodes are connected to external electrodes provided on the end surfaces.

In this method, a lead portion of the internal electrode is configured to have a shape including a taper-shaped portion in which the width gradually decreases with increasing proximity to the end surface of the ceramic element, the end portion opposite to the above-mentioned lead portion of the internal electrode is substantially rectangular. A pair of internal electrodes facing each other with the above-mentioned ceramic layer therebetween are laminated while the locations thereof are displaced with respect to each other such that a corner portion in the substantially rectangular portion of the one internal electrode is located in the vicinity of, but outside the above-mentioned taper-shaped portion of the other internal electrode.

Therefore, overlapping of thick portions, e.g. the corner portion of the internal electrode, is prevented, and thereby, the occurrences of the internal stress is prevented. Consequently, it is possible to efficiently manufacture a highly reliable laminated ceramic electronic component which has no structural defect, e.g. peeling, and which is not susceptible to water from the outside.

(1-2): A laminated ceramic electronic component includes a plurality of internal electrodes, having patterns formed by a screen printing method and facing each other with a ceramic layer therebetween, which are provided in a ceramic element, and the internal electrodes facing each other are alternately led out to opposed end surfaces of the ceramic element such that the internal electrodes are connected to external electrodes provided on the end surfaces.

In this laminated ceramic electronic component, a lead portion of one of the internal electrodes is provided with a taper-shaped portion in which the width gradually decreases with increasing proximity to the end surface of the ceramic element, the end portion opposite to the above-mentioned lead portion of the internal electrode is preferably substantially rectangular. In a pair of the internal electrodes which face each other with the above-mentioned ceramic layer therebetween, a corner portion in the substantially rectangular portion opposite to the above-mentioned lead portion of the internal electrode is arranged to be located in the vicinity of, but outside the above-mentioned taper-shaped portion of the other internal electrode.

Therefore, overlapping of thick portions, e.g. the corner portion of the internal electrode is prevented, and thereby, occurrences of the internal stress are prevented. Consequently, occurrences of structural defects, e.g. peeling, and the influence of water from the outside are prevented, and thereby, the reliability of the laminated ceramic electronic component is greatly improved.

In the laminated ceramic electronic component according to preferred embodiments of the present invention, while only small regions in corner portions of the internal electrode do not contribute to the formation of capacitance as compared to that in the conventional laminated ceramic electronic component, it is possible to prevent occurrences of internal defects and to greatly improve the reliability with substantially no reduction in the available capacitance.

In the present invention, it is only essential that the taper-shaped portion of the internal electrode is provided in a portion of the lead portion. For example, regarding the shape, it is also possible to provide a lead portion having a taper-shaped portion in which the width gradually decreases with increasing proximity to the end side, and a parallel portion, which is parallel to the leading direction of the internal electrode, at the portion nearer to the end side.

The above-described manufacturing method and the configuration of the laminated ceramic electronic component will be described below in further detail.

First Preferred Embodiment (1) A barium titanate-based material as a ceramic raw material powder, poly vinyl butyral as a resin binder, dioctyl phthalate as a plasticizer and ethanol and toluene as solvents were prepared. These were mixed and dispersed, such that a ceramic slurry was prepared.

(2) Ceramic green sheets of about 3 μm in thickness were prepared using this ceramic slurry.

Figure 1B:
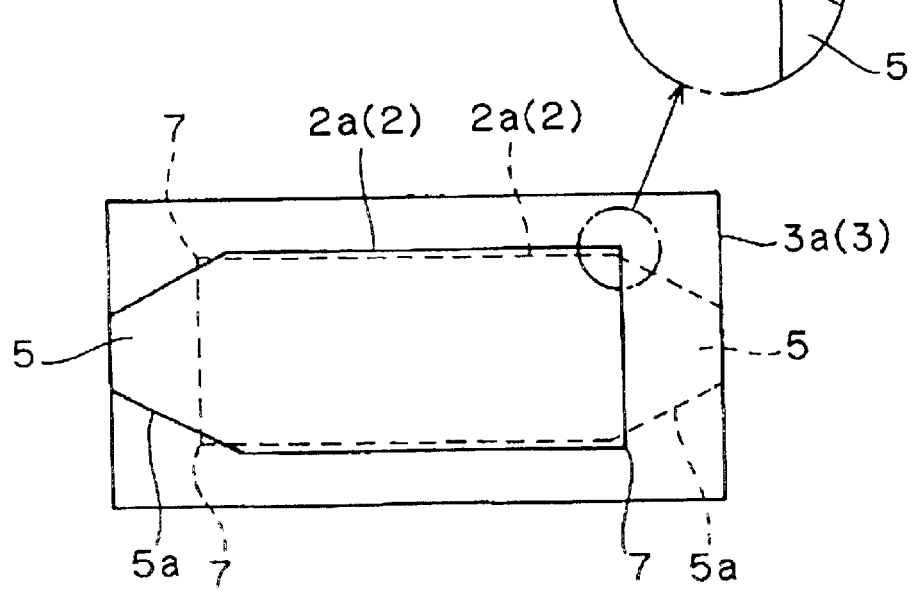

(3) As shown in FIGS. 1A and 1B, a conductive paste including a base metal powder as a conductive component was printed using a screen printing method on the surface of the ceramic green sheet 3a (ceramic layer 3), and thereby, an internal electrode pattern 2a (internal electrode 2) was formed, in which a lead portion 5 has a tapered shape such that the width gradually decreased with increasing proximity to the end portion of the ceramic green sheet 3a, and the angles of corner portions 7 of the end portion 6 opposite to the lead portion 5 (taper-shaped portion 5a) are substantially a right angle such that the end portion 6 is substantially rectangular.

Figure 2:
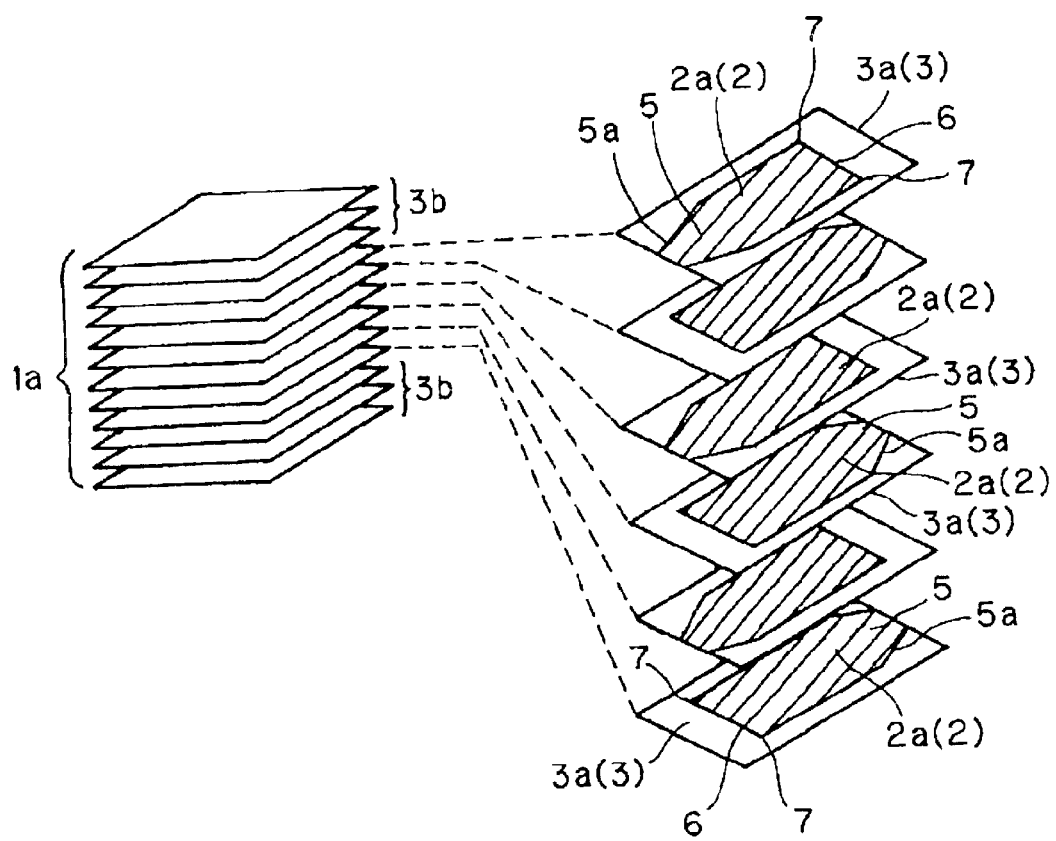
FIG. 2 is a perspective, exploded view illustrating the configuration and manufacturing method of a monolithic ceramic capacitor according to a preferred embodiment of the present invention.

(4) A laminate was formed by laminating 300 sheets of the ceramic green sheets 3a provided with this internal electrode pattern 2a (internal electrode 2) and further by laminating, on the top and bottom thereof, ceramic green sheets (dummy sheets) 3b having no internal electrode patterns. The resulting laminate was pressed, followed by cutting the laminate into a product having dimensions of approximately 3.2 mm long×1.6 mm wide×1.6 mm high, such that an unfired ceramic element 1a was produced. FIG. 2 is a perspective, exploded view schematically showing the configuration of this ceramic element 1a.

When the ceramic green sheets 3a were laminated, as shown in FIG. 1B, the internal electrode patterns 2a were laminated while the locations thereof were displaced with respect to each other such that a corner portion 7 in the substantially rectangular portion of one internal electrode 2a was located in the vicinity of, but outside of the taper-shaped portion 5a of the other internal electrode pattern 2a facing the corner portion.

(5) Subsequently, degreasing was performed, and furthermore, firing was performed in a furnace under a controlled atmosphere of $N_2+H_2$ ($H_2=5\%$) at a temperature of approximately 1,300° C.

Figure 3:
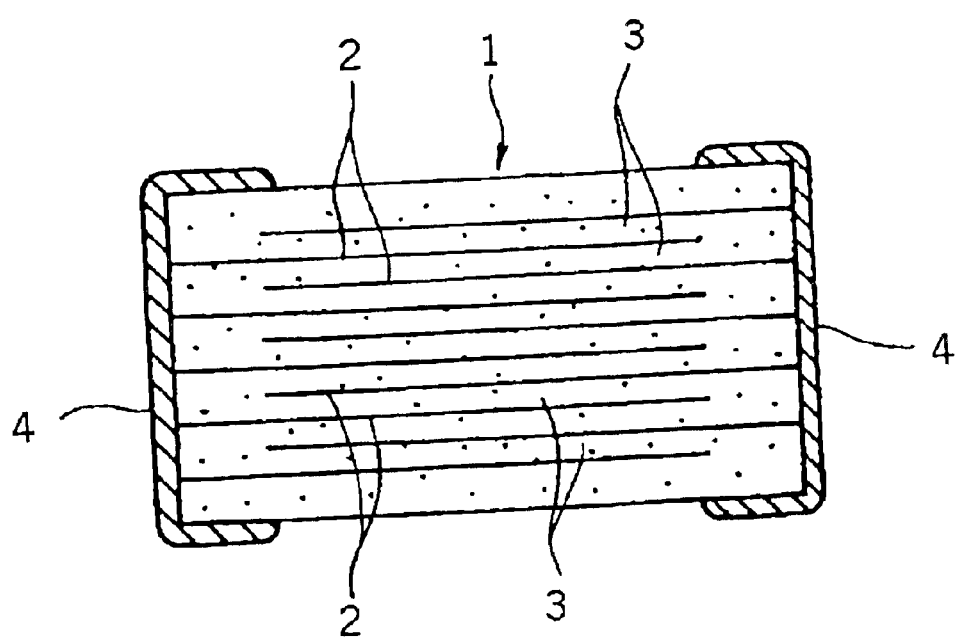
FIG. 3 is a sectional view showing a monolithic ceramic capacitor manufactured by a method for manufacturing a monolithic ceramic capacitor according to a preferred embodiment of the present invention.

(6) After the firing, as shown in FIG. 3, a Cu paste was applied on both end surfaces of the ceramic element 1, followed by baking. Ni plating and Sn plating were successively applied thereon, such that a pair of external electrodes 4 was formed.

In this manner, as shown in FIG. 3, a monolithic ceramic capacitor was prepared so as to have a structure in which a plurality of internal electrodes 2 were laminated with the ceramic layer 3 therebetween in the ceramic element 1, and the internal electrodes 2 facing each other with the ceramic layer therebetween were alternately led out to opposed end surfaces of the ceramic element 1 such that the internal electrodes were connected to external electrodes 4 provided on the end surfaces.

With respect to the monolithic ceramic capacitor according to preferred embodiments of the present embodiment, the presence or absence of the structural defect after firing was determined, a crack accelerated evaluation and a thermal shock test were performed, and thereby, characteristics were examined. At this time, the characteristics of a monolithic ceramic capacitor (Example 1-1 and Example 1-2), in which the amount of displacement of the internal electrodes was controlled to about 50 μm or about 250 μm, were examined.

The presence or absence of structural defects after firing was verified by observing peeling defects in the lead portion of the internal electrode.

The crack accelerated evaluation was performed by examining the degradation of IR (Insulation Resistance) based on a PCT test (high-temperature load test) of exposure to high-temperature high-pressure steam for about 50 hours.

The thermal shock test was performed by immersing the monolithic ceramic capacitor (chip) in solder at about 300° C. or about 350° C. and examining occurrences of cracks.

The results thereof are shown in Table 1.

Figure 19:
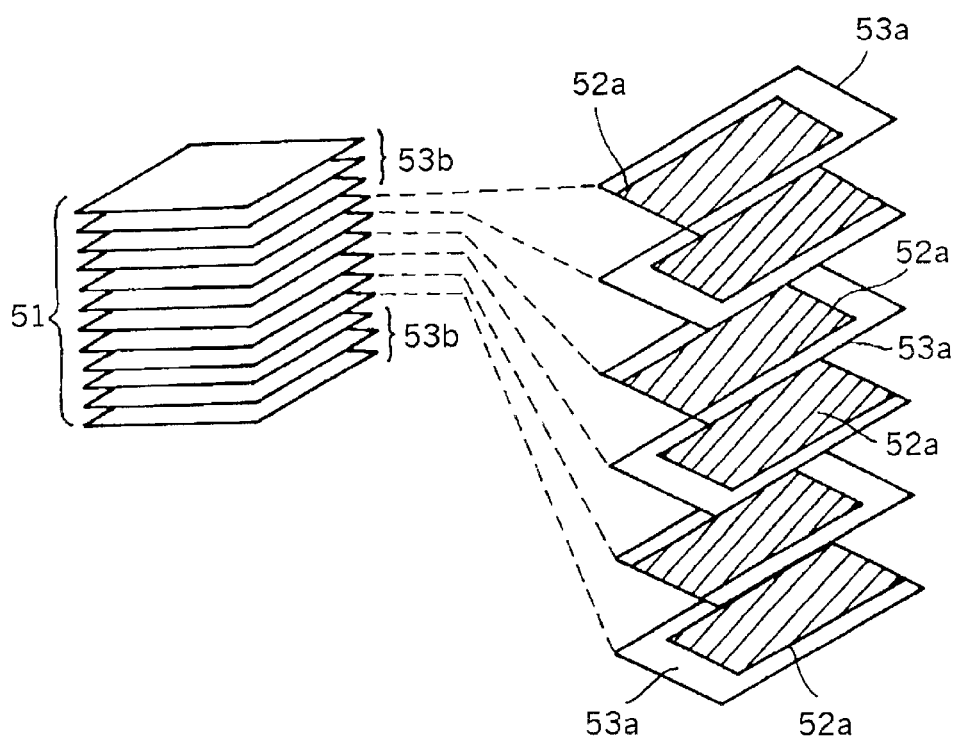
FIG. 19 is a perspective, exploded view for illustrating the configuration and manufacturing method of a conventional monolithic ceramic capacitor.
Figure 20A:
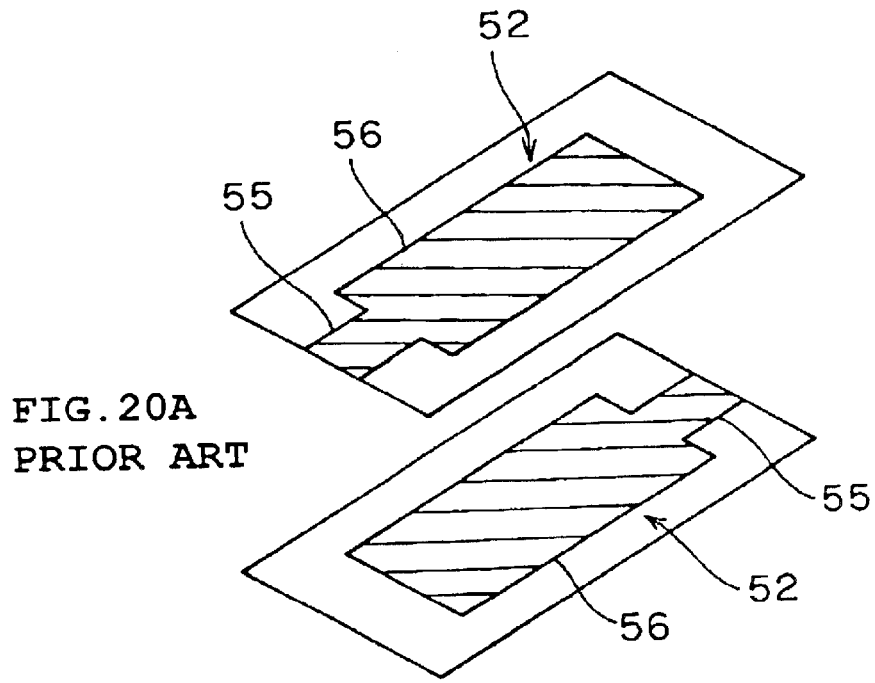
FIGS. 20A and 20B are diagrams showing the configuration of another conventional monolithic ceramic capacitor.
Figure 20B:
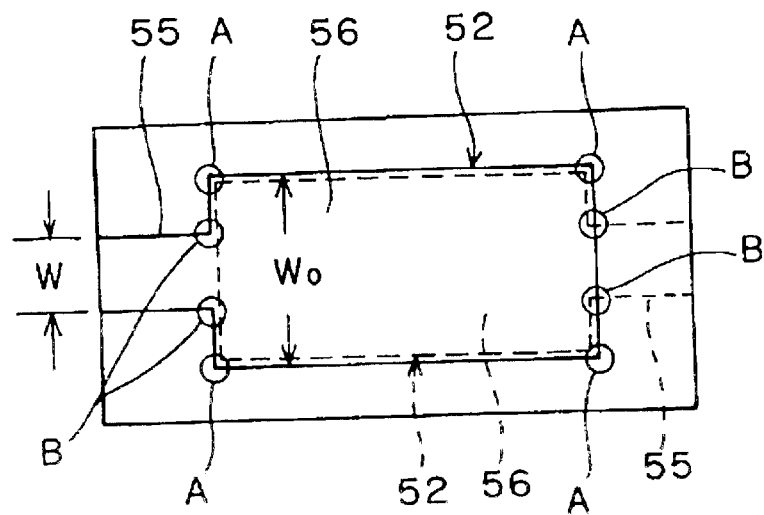
Figure 21:
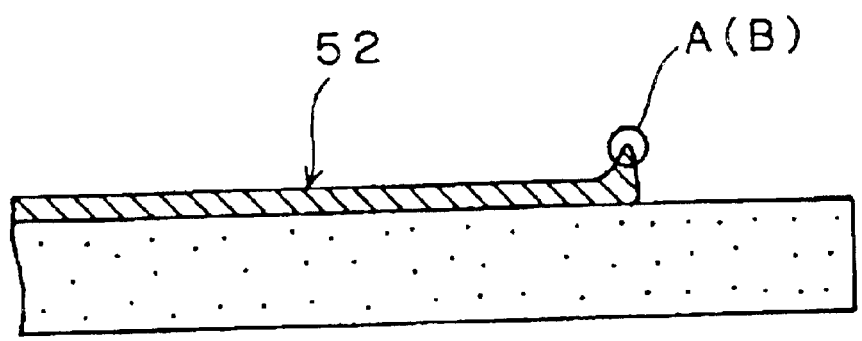
FIG. 21 is a sectional view schematically showing a state in which the thicknesses of corner portions and the like of the internal electrode are increased.

In a manner similar to that in the above-mentioned Example 1-1 and Example 1-2, the characteristics were examined with respect to a conventional monolithic ceramic capacitor (Comparative example 1) in which internal electrodes were configured to be substantially rectangular, as shown in FIG. 19, a conventional monolithic ceramic capacitor (Comparative example 2) in which the width W of a lead portion of an internal electrode was configured to be less than the width $W_0$ of a capacitance-forming portion, as shown in FIGS. 20A and 20B, and a monolithic ceramic capacitor (Comparative example 3) in which the width W of a lead portion of an internal electrode was configured to be less than the width $W_0$ of a capacitance-forming portion so as to form a taper-shaped portion, but the positions of the internal electrodes were not displaced with respect to each other (that is, corner portions in a substantially rectangular portion of one internal electrode overlapped the base end portion of the taper-shaped portion). The results thereof are also shown in Table 1. At this time, the width W of the lead portion of each example was set to be the same.

TABLE 1

|  | Amount of displacement of electrodes | Peeling defect in lead portion of internal electrode | IR degradation rate based on PCT test | Thermal shock test ΔT Defect occurence rate 300° C. | 350° C. | Capacitance |
|---|---|---|---|---|---|---|
| Example 1-1 | 50 μm | less than 0.1 ppm | 0.0% | 0/100 | 0/100 | 10.19 μF |
| Example 1-2 | 250 μm | less than 0.1 ppm | 0.0% | 0/100 | 0/100 | 10.05 μF |
| Comparative example 1 | 0 μm | 100 ppm | 0.1% | 0/100 | 3/100 | 10.20 μF |
| Comparative example 2 | 0 μm | less than 0.1 ppm | 0.0% | 1/100 | 10/100 | 10.20 μF |
| Comparative example 3 | 0 μm | less than 0.1 ppm | 0.0% | 0/100 | 4/100 | 10.20 μF |

As is clear from Table 1, with respect to every capacitor in which the width W of the lead portion of the internal electrode is less than the width $W_0$ of the capacitance-forming portion except for Comparative example 1 including substantially rectangular internal electrodes, the peeling defect in the lead portion is less than about 0.1 ppm, and no IR degradation occurs based on the PCT test. On the other hand, with respect to Comparative example 1, the peeling defect in the lead portion is increased to about 100 ppm, and about 0.1% of IR degradation occurs based on the PCT test.

However, in the thermal shock test, the crack occurrence rates of Comparative Example 2 and Comparative Example 3, in which the width W of the lead portion of the internal electrode is less than the width $W_0$ of the capacitance-forming portion, are greater than that of Comparative Example 1 including substantially rectangular internal electrodes. The reason for this is that the width W of the lead portion of the internal electrode is less than the width $W_0$ of the capacitance-forming portion in Comparative Example 2 and Comparative Example 3, and thereby, portions, e.g. a boundary between the lead portion of the internal electrode and the capacitance-forming portion, are increased, in which the electrode thickness is likely to increase during printing and formation of the internal electrode pattern by a screen printing method.

On the other hand, as is clear from Table 1, in the monolithic ceramic capacitors of Example 1-1 and Example 1-2 in which taper-shaped portions are included, and the locations of the internal electrodes are displaced with respect to each other, no cracks occur during the thermal shock test. The reason for this is that the positions of the internal electrodes are displaced with respect to each other, and thereby, overlapping of portions in which the electrode thickness is likely to increase during screen printing is avoided.

As described above, according to the first preferred embodiment, substantially no peeling defect in the lead portion of the internal electrode occurs, the IR degradation based on the PCT test is greatly improved, the occurrence of cracks during the thermal shock test is prevented, and therefore, a monolithic ceramic capacitor having excellent characteristics is provided.

In the monolithic ceramic capacitors according to the first preferred embodiment (the samples of Example 1-1 and Example 1-2), since only small regions in corner portions of the internal electrode do not contribute to the formation of capacitance as compared to the conventional monolithic ceramic capacitors of Comparative examples 1 to 3, the available capacitance is not substantially reduced, as shown in Table 1. In this case, although the internal stress due to the thermal shock is reduced with an increase in the amount of replacement, the available capacitance is reduced correspondingly. In the monolithic ceramic capacitor according to the above-mentioned first preferred embodiment, if the amount of replacement exceeds about 300 μm, the available capacitance is reduced by at least about 10% as compared to the intrinsic capacitance.

Second Preferred Embodiment

Figure 4A:
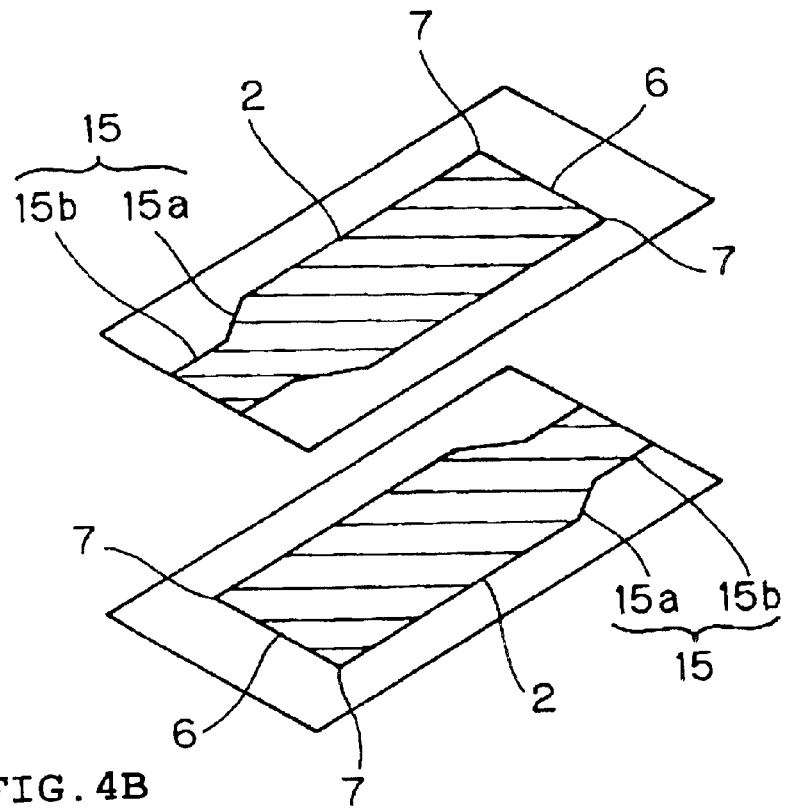
FIGS. 4A and 4B are diagrams showing internal electrodes constituting a monolithic ceramic capacitor according to another preferred embodiment of the present invention.
Figure 4B:
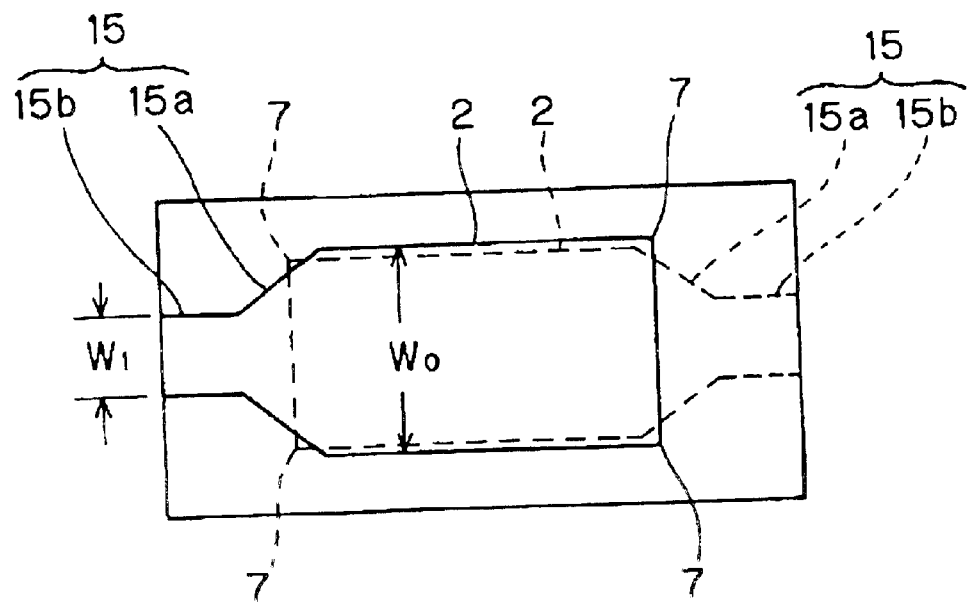

FIGS. 4A and 4B are diagrams showing monolithic ceramic capacitor according to a second preferred embodiment of the present invention. FIG. 4A is a perspective view showing the shape of a pair of internal electrodes, and FIG. 4B is a plan view showing the overlapping state of a pair of the internal electrodes. In FIGS. 4A and 4B, portions indicated by the same reference numerals as in FIG. 1 denote the same or a corresponding portion.

In the second preferred embodiment, as shown in FIGS. 4A and 4B, a lead portion 15 of an internal electrode 2 is configured to have a tapered-shape portion 15a having a width that gradually decreases with increasing proximity to the end side and a parallel portion 15b parallel to the leading direction of the internal electrode, which is formed in the side that is closer to the end than is the taper-shaped portion 15a and which has the width $W_1$ that is less than the width $W_0$ of a capacitor-forming portion.

In the monolithic ceramic capacitor according to the second preferred embodiment, when the shape of the inner electrode 2 is configured in the shape provided with the taper-shaped portion 15a and the parallel portion 15b, as shown in FIGS. 4A and 4B, effects equivalent to that of the monolithic ceramic capacitor according to the first preferred embodiment shown in FIGS. 1 to 3 are achieved.

The present invention is not limited to the above-mentioned first and second preferred embodiments. For example, both edges of the taper-shaped portion may be curved, and the corner portion of the substantially rectangular portion may be slightly rounded. Various applications and modifications within the scope of the invention can be performed with respect to the type of the conductive paste applied by a screen printing method, the specific shape of the printing pattern (internal electrode pattern), the type of the ceramic used as a dielectric material, the number of lamination of internal electrode layers, the arrangement position and the pattern of the external electrode, and the like.

Preferred embodiments of the present invention further include the following specific configurations (2-1) to (2-3).

(2-1): A laminated ceramic electronic component including a plurality of internal electrodes facing each other with a ceramic layer therebetween are provided in a ceramic element, and the internal electrodes facing each other are alternately led out to opposed end surfaces of the ceramic element such that the internal electrodes are connected to external electrodes provided on the end surfaces. The lead side of each internal electrode of a pair of the internal electrodes includes a lead-side width-decreasing portion having a width gradually decreasing with increasing proximity to lead-side end surface of the ceramic element, the end side opposite to the lead side of each of a pair of the internal electrodes is configured such that the tip of the corner portion is cut away, and the lead-side width-decreasing portion of one internal electrode of the internal electrodes facing each other and the end-side corner portion, with the tip cut away, of the other internal electrode do not face each other.

Therefore, occurrence of the residual stress is prevented, and occurrence of the structural defect, e.g. peeling, is suppressed or prevented.

In various preferred embodiments of the present invention, it is only essential that the lead-side width-decreasing portion of the internal electrode is provided in a portion of the lead portion side of the internal electrode. For example, it is also possible to provide a taper-shaped portion, in which the width gradually decreases with increasing proximity to the lead-side end surface of the ceramic element, as the lead-side width-decreasing portion, and in addition, to provide a parallel portion, which is substantially parallel to the leading direction of the internal electrode, in the side that is closer to the end in the leading direction (lead-side end surface of the ceramic element) than the lead-side width-decreasing portion (taper-shaped portion) or to provide a width-increasing portion having a width gradually increasing with increasing proximity to the end side, in the side closer to the end side in the leading direction than the lead-side width-decreasing portion.

By adjusting the width of the lead portion of the internal electrode to be less than the width of the capacitor-forming portion, entrance of water from the outside is effectively prevented, and thereby, the reliability is greatly improved.

(2-2): A laminated ceramic electronic component includes a lead-side width-decreasing portion of each internal electrode of a pair of internal electrodes facing each other so as to have a tapered shape with a width that gradually decreases with increasing proximity to lead-side end surface of the ceramic element, each of the end-side corner portions has a tapered shape with the tip portion slantingly cut away, the length of the tapered side of the taper-shaped portion of the lead-side width-decreasing portion of one internal electrode of a pair of the internal electrodes facing each other is different from that of the taper-shaped portion of the end-side corner portion of the other internal electrode, and thereby, the taper-shaped portion of the lead-side width-decreasing portion and the taper-shaped portion of the end-side corner portion does not directly oppose each other.

Therefore, the taper-shaped portion of the lead-side width-decreasing portion and the taper-shaped portion of the end-side corner portion are reliably prevented from directly facing each other, and occurrence of the residual stress is suppressed or prevented.

(2-3): A laminated ceramic electronic component includes a lead-side width-decreasing portion of each internal electrode of a pair of internal electrodes facing each other so as to have a rounded shape with a predetermined radius of curvature such that the width gradually decreases with increasing proximity to lead-side end surface of the ceramic element, the end-side corner portion of each internal electrode of a pair of the internal electrodes facing each other has a rounded shape with a predetermined radius of curvature, the radius of curvature of the lead-side width-decreasing portion of one internal electrode of the internal electrodes facing each other is different from the radius of curvature of the end-side corner portion of the other internal electrode, and thereby, the lead-side width-decreasing portion and the end-side corner portion does not directly face each other.

Therefore, the lead-side width-decreasing portion and the end-side corner portion are reliably prevented from directly facing each other with a correct position or a close correspondence therebetween, and occurrence of the residual stress can be suppressed or be prevented.

The configurations (2-1) to (2-3) will be described below in further detail.

Third Preferred Embodiment

Figure 5:
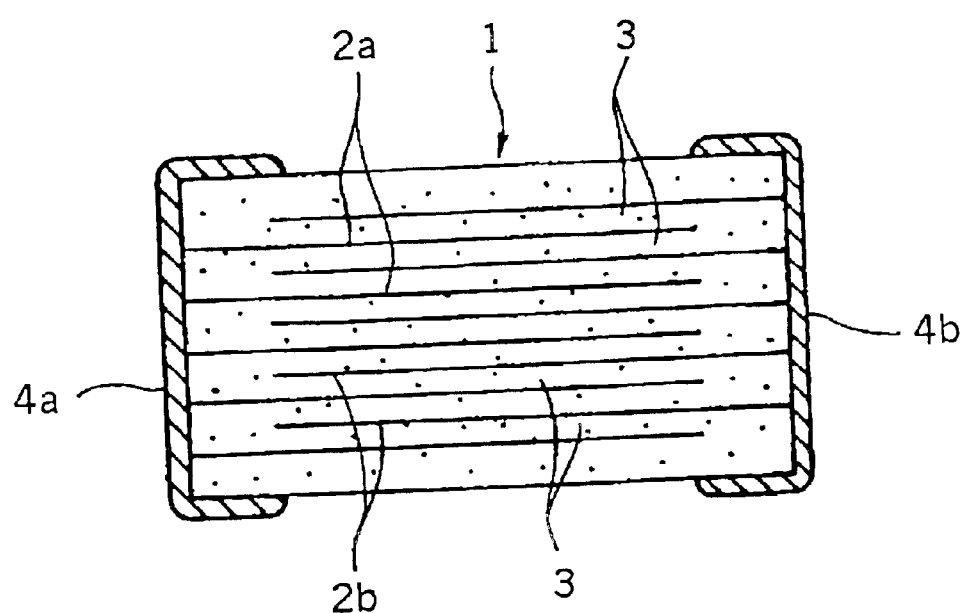
FIG. 5 is a sectional view of a monolithic ceramic capacitor according to a third preferred embodiment of the present invention.
Figure 6A:
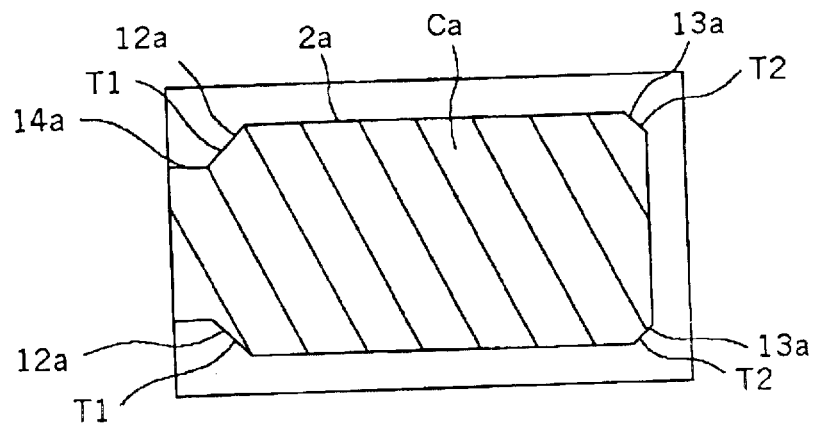
FIG. 6A is a plan view showing patterns of a pair of internal electrodes of the monolithic ceramic capacitor according to the third preferred embodiment of the present invention.
Figure 6B:
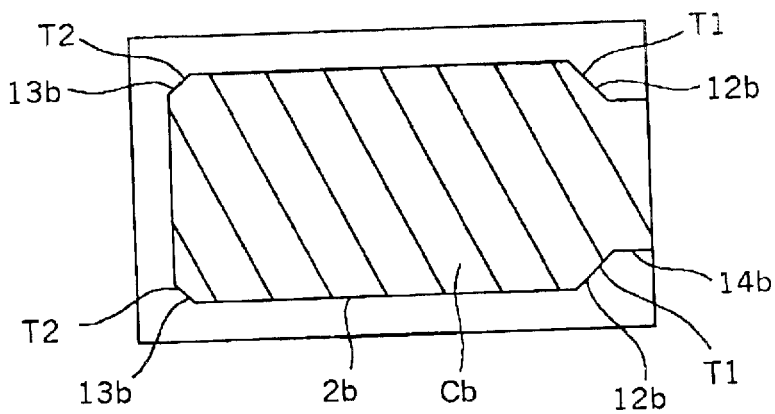
FIG. 6B is a plan view showing the overlapping state of the internal electrodes.
Figure 6B:
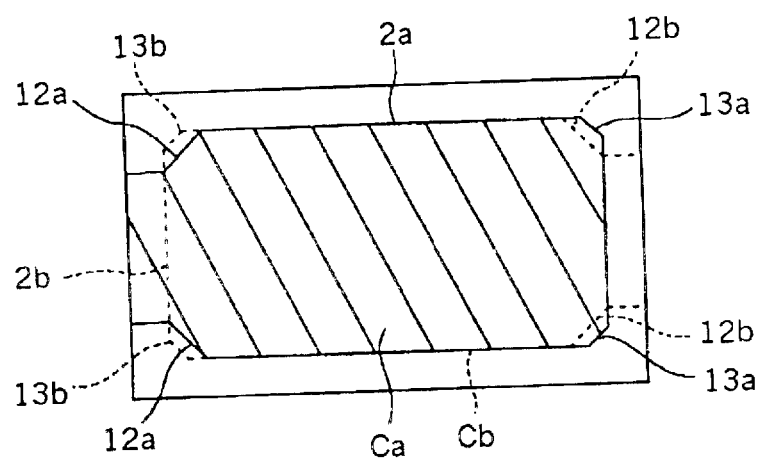

FIG. 5 is a sectional view of a laminated ceramic electronic component according to a preferred embodiment of the present invention. FIG. 6A is a plan view showing patterns of internal electrodes. FIG. 6B is a plan view showing the overlapping state of the internal electrodes.

As shown in FIG. 5 and FIGS. 6A and 6B, the monolithic ceramic capacitor according to the third preferred embodiment is configured such that a plurality of internal electrodes $2a$ and $2b$ are laminated with the ceramic layer 3, which is a dielectric layer, therebetween in the ceramic element 1, and the internal electrodes $2a$ and $2b$ facing each other are alternately led out to opposed end surfaces of the ceramic element 1 such that the internal electrodes are connected to external electrodes $4a$ and $4b$ provided on the end surfaces.

In the monolithic ceramic capacitor according to the third preferred embodiment, a pair of the internal electrodes $2a$ and $2b$ facing each other alternately are led out to opposed end surfaces of the ceramic element 1, the lead sides of a pair of the internal electrodes $2a$ and $2b$ are provided with portions (lead-side width-decreasing portions) $12a$ and $12b$ having tapered shapes with a width gradually decreasing with increasing proximity to the lead-side end surface of the ceramic element 1, and the end-side corner portions $13a$ and $13b$ opposite to the lead sides of a pair of the internal electrodes $2a$ and $2b$ have tapered shapes in which the tips of the corner portions are cut away.

Furthermore, parallel portions $14a$ and $14b$, which have widths less than that of capacitor-forming portions Ca and Cb of the internal electrodes $2a$ and $2b$ and which are parallel to the leading direction of the internal electrodes $2a$ and $2b$, are provided in the side nearer to the end (lead-side end surface of the ceramic element 1) than are the lead-side width-decreasing portions $12a$ and $12b$.

The length of a taper side T1 of the taper-shaped portion of the lead-side width-decreasing portion $12a$ ($12b$) of one internal electrode $2a$ ($2b$) of the internal electrodes facing each other and the length of a taper side T2 of the taper-shaped portion of the end-side corner portion $13b$ ($13a$) of the other internal electrode $2b$ ($2a$) are different from each other (T1>T2), and thereby, the taper-shaped portions of the lead-side width-decreasing portions $12a$ and $12b$ and the taper-shaped portions of the end-side corner portions $13a$ and $13b$ are configured so as not to directly facing each other.

In the third preferred embodiment, the taper side T1 is provided to have a length that is greater than that of the taper side T2. However, the dimensional relationship between the lengths of the taper sides (T1 and T2) can be reversed.

In the monolithic ceramic capacitor according to the third preferred embodiment, the internal electrodes $2a$ and $2b$ facing each other preferably have the same rotationally symmetrical shape. However, it is possible to have different shapes.

Next, a method for manufacturing this monolithic ceramic capacitor will be described.

(1) A ceramic slurry primarily including a dielectric ceramic, e.g. barium titanate-based ceramic, is prepared. This ceramic slurry is sheet-molded, and thereby, a ceramic green sheet is produced.

(2) A conductive paste containing a Ni powder is printed on the substantially rectangular ceramic green sheets, and thereby, internal electrode patterns having the shape corresponding to internal electrodes $2a$ and $2b$ (FIG. 5 and FIGS. 6A and 6B) are printed.

(3) An appropriate number of the ceramic green sheets are alternately, repeatedly laminated, substantially rectangular ceramic green sheets provided with no internal electrode pattern are laminated on the top and bottom thereof, on an as needed basis, followed by pressure bonding, and thereby, an unfired ceramic laminate is produced.

(4) The unfired ceramic laminate is degreased under a predetermined condition, followed by firing. In this manner, the internal electrode patterns are baked, and the internal electrodes $2a$ and $2b$ (FIG. 5 and FIGS. 6A and 6B) are formed. The ceramic green sheets are fired, and thereby, ceramic layers 3 (FIG. 5) are formed, so that the ceramic element 1 (FIG. 5) is formed.

(5) A conductive paste containing Cu is applied, followed by firing, and thereby, external electrodes $4a$ and $4b$ (FIG. 5) are formed.

(6) Subsequently, Ni plating and Sn plating are applied to the external electrodes $4a$ and $4b$ (not shown in the drawing), and thereby, the monolithic ceramic capacitor (completed product) shown in FIG. 5 is produced.

This monolithic ceramic capacitor preferably has dimensions of approximately 3.2 mm (length)×1.6 mm (width)×1.6 mm (height), the thickness of the ceramic layer (dielectric layer) 3 is about 2 $\mu$m, and the number of electrode sheets is 460.

In the above-mentioned third preferred embodiment, monolithic ceramic capacitors were prepared as Experimental examples 1 to 6 described below, in which the length of a taper side T1 of the taper-shaped portion of the lead-side width-decreasing portion $12a$ ($12b$) of one internal electrode $2a$ ($2b$) of the internal electrodes facing each other and the length of a taper side T2 of the taper-shaped portion of the end-side corner portion $13b$ ($13a$) of the other internal electrode $2b$ ($2a$) were differentiated.

(1) EXPERIMENTAL EXAMPLE 1

A monolithic ceramic capacitor of Experimental example 1 has a configuration including lead-side width-decreasing portions $12a$ and $12b$ having the shapes in which substantially rectangular isosceles triangles having the lengths of the sides forming a right angle of 240 $\mu$m (T1=339 $\mu$m) are cut away in the lead sides of the internal electrodes $2a$ and $2b$, and the end-side corner portions $13a$ and $13b$ having the shapes in which substantially rectangular isosceles triangles having the lengths of the sides forming a right angle of 120 $\mu$m (T2=170 $\mu$m) are cut away in the end sides of the internal electrodes $2a$ and $2b$.

(2) EXPERIMENTAL EXAMPLE 2

A monolithic ceramic capacitor of Experimental example 2 has a configuration including the end-side corner portions 13a and 13b having the shapes in which substantially rectangular isosceles triangles having the lengths of the sides forming a right angle of 160 μm (T2=226 μm) are cut away in the end sides of the internal electrodes 2a and 2b. Lead-side width-decreasing portions 12a and 12b are the same as that in Experimental example 1.

(3) EXPERIMENTAL EXAMPLE 3

A monolithic ceramic capacitor of Experimental example 3 has a configuration including the end-side corner portions 13a and 13b having the shapes in which substantially rectangular isosceles triangles having the lengths of the sides forming a right angle of 80 μm (T2=113 μm) are cut away in the end sides of the internal electrodes 2a and 2b. Lead-side width-decreasing portions 12a and 12b are the same as that in Experimental example 1.

(4) EXPERIMENTAL EXAMPLE 4

A monolithic ceramic capacitor of Experimental example 4 has a configuration including the end-side corner portions 13a and 13b having the shapes in which substantially rectangular isosceles triangles having the lengths of the sides forming a right angle of 40 μm (T2=57 μm) are cut away in the end sides of the internal electrodes 2a and 2b. Lead-side width-decreasing portions 12a and 12b are the same as that in Experimental example 1.

(5) EXPERIMENTAL EXAMPLE 5

A monolithic ceramic capacitor of Experimental example 5 has a configuration including the end-side corner portions 13a and 13b having the shapes in which substantially rectangular isosceles triangles having the lengths of the sides forming a right angle of 200 μm (T2=283 μm) are cut away in the end sides of the internal electrodes 2a and 2b. Lead-side width-decreasing portions 12a and 12b are the same as that in Experimental example 1.

(6) EXPERIMENTAL EXAMPLE 6

A monolithic ceramic capacitor of Experimental example 6 has a configuration including the end-side corner portions 13a and 13b having the shapes in which substantially rectangular isosceles triangles having the lengths of the sides forming a right angle of 320 μm (T2=452 μm) are cut away in the end sides of the internal electrodes 2a and 2b. Lead-side width-decreasing portions 12a and 12b are the same as that in Experimental example 1.

For purposes of comparison, the following monolithic ceramic capacitors of Comparative examples 1, 2, and 3 were prepared.

(1) COMPARATIVE EXAMPLE 1

Figure 8A:
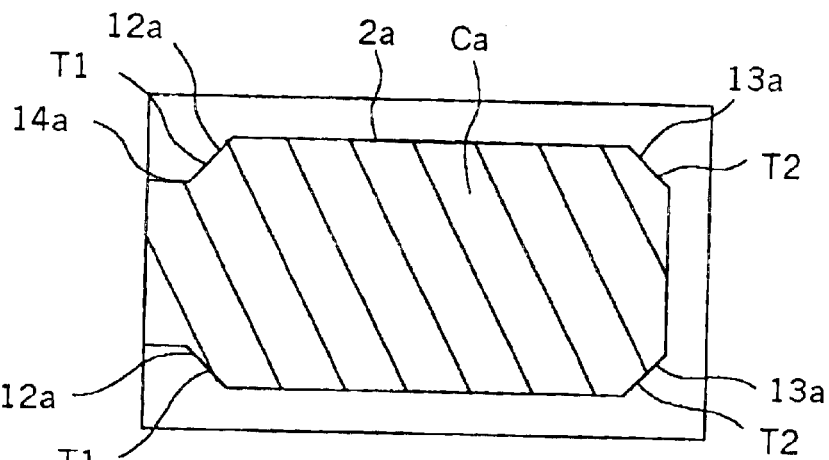
FIG. 8A is a plan view showing patterns of a pair of internal electrodes of a monolithic ceramic capacitor of Comparative Example 1 related to the third preferred embodiment.
Figure 8B:
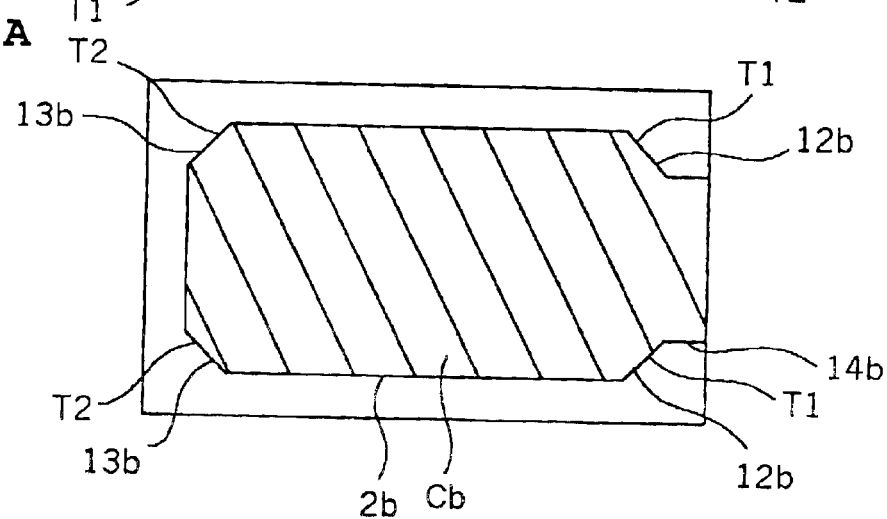
FIG. 8B is a plan view showing the overlapping state of the internal electrodes.
Figure 8B:
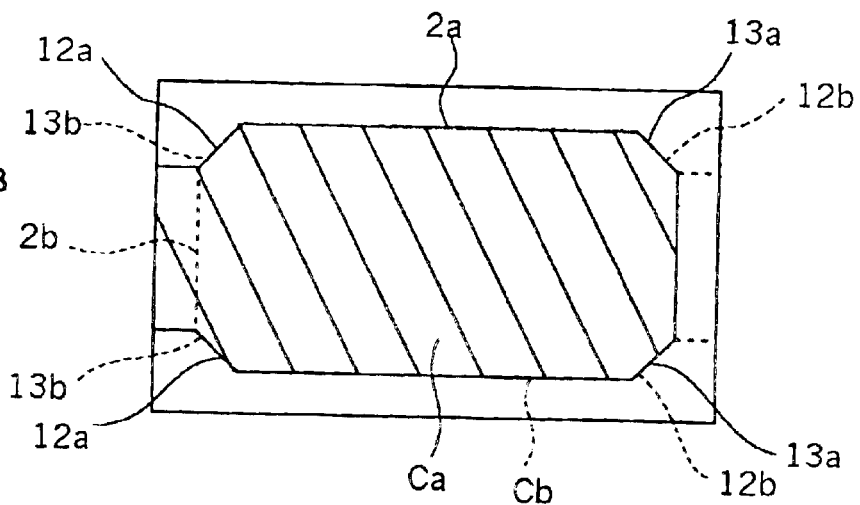

In a monolithic ceramic capacitor of this Comparative example 1, as shown in FIGS. 8A and 8B, the lead sides of a pair of the internal electrodes 2a and 2b are provided with portions (lead-side width-decreasing portions) 12a and 12b having tapered shapes with a width gradually decreasing with increasing proximity to lead-side end surface of the ceramic element 1, and the end-side corner portions 13a and 13b opposite to the lead sides of a pair of the internal electrodes 2a and 2b have tapered shapes in which the tips of the corner portions are cut away. However, in this configuration, the length of a taper side T1 of the taper-shaped portion of the lead-side width-decreasing portion 12a (12b) of one internal electrode 2a (2b) of the internal electrodes facing each other and the length of a taper side T2 of the taper-shaped portion of the end-side corner portion 13b (13a) of the other internal electrode 2b (2a) are the same, and thereby, when the capacitor-forming portions Ca and Cb of a pair of the internal electrodes 2a and 2b facing each other are opposed to each other, the taper-shaped portions of the lead-side width-decreasing portions 12a and 12b and the taper-shaped portions of the end-side corner portions 13a and 13b directly face each other (refer to FIG. 8B). The other configurations are the same as that in the monolithic ceramic capacitor of the above-mentioned third preferred embodiment.

In Comparative example 1, both of the lead-side width-decreasing portions 12a and 12b and the end-side corner portions 13a and 13b have tapered shapes in which substantially rectangular isosceles triangles having the lengths of the sides forming a right angle of about 240 μm are cut away.

(2) COMPARATIVE EXAMPLE 2

Figure 9:
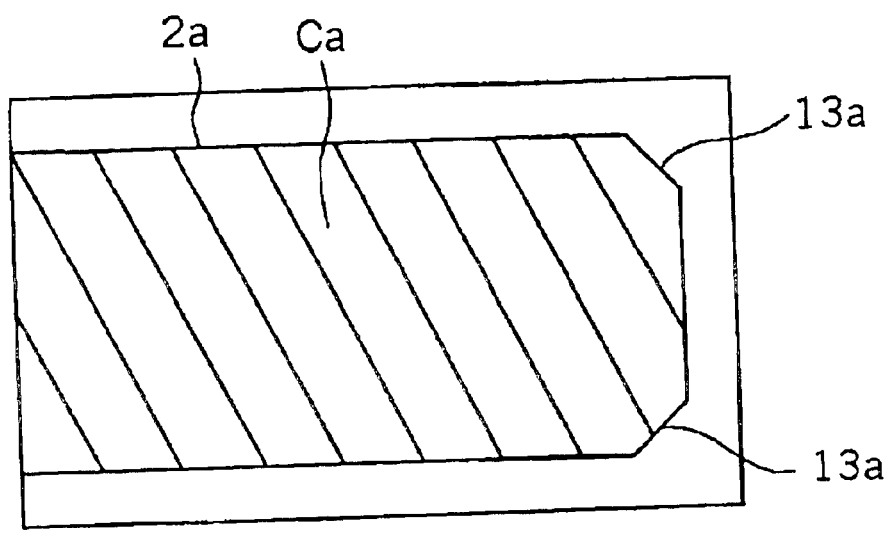
FIG. 9 is a plan view showing patterns of a pair of internal electrodes of a monolithic ceramic capacitor of Comparative Example 2 related to the third preferred embodiment of the present invention.
Figure 9:
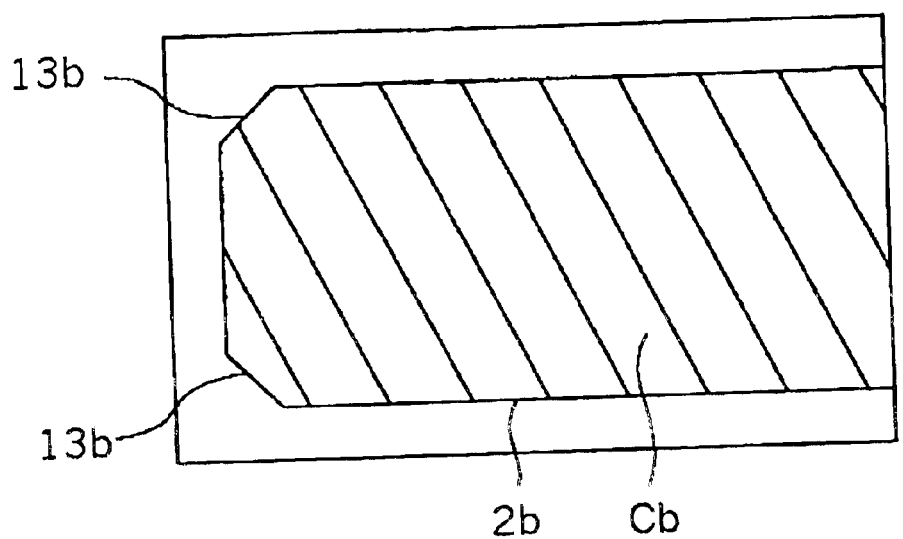

As shown in FIG. 9, a monolithic ceramic capacitor of Comparative example 2 has a configuration in which the lead sides of a pair of the internal electrodes 2a and 2b are led out to the end portions of the ceramic element while the widths are not specifically changed, and the end-side corner portions 13a and 13b opposite to the lead sides of a pair of the internal electrodes 2a and 2b have tapered shapes in which the tips of the corner portions are cut away. The other configurations are preferably the same as that in the monolithic ceramic capacitor of the above-mentioned third preferred embodiment.

In Comparative example 2, the end-side corner portions 13a and 13b have a tapered shape in which substantially rectangular isosceles triangles having the lengths of the sides forming a right angle of about 240 μm are cut away.

(3) COMPARATIVE EXAMPLE 3

Figure 10:
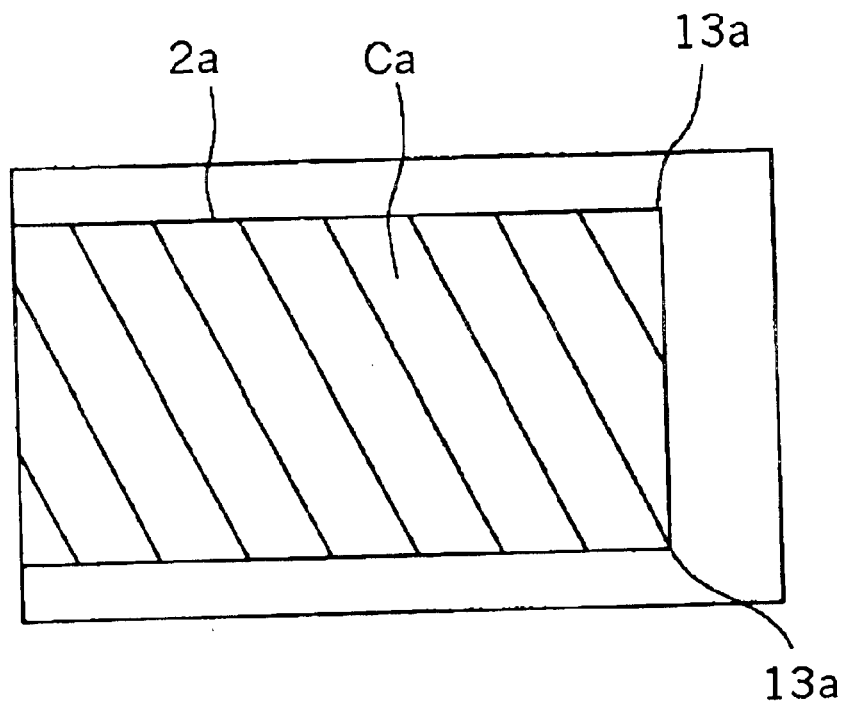
FIG. 10 is a plan view showing patterns of a pair of internal electrodes of a monolithic ceramic capacitor of Comparative Example 3 related to the third preferred embodiment of the present invention.
Figure 10:
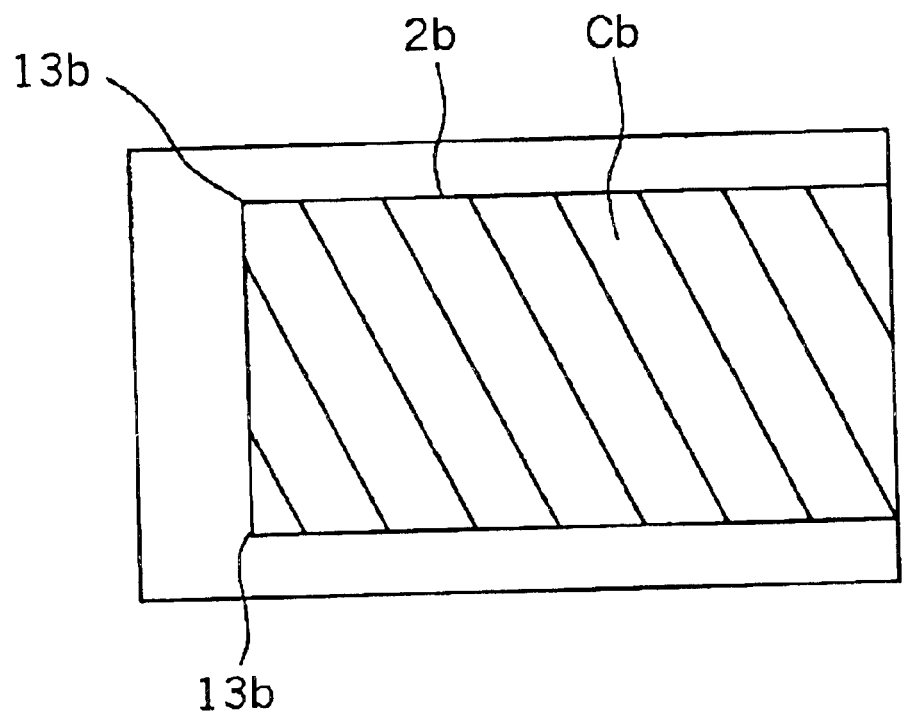

As shown in FIG. 10, a monolithic ceramic capacitor of Comparative example 3 has a configuration in which substantially rectangular internal electrodes 2a and 2b are provided, the lead sides of the internal electrodes 2a and 2b are led out to the end portions of the ceramic element while the widths are not specifically changed, and the end-side corner portions 13a and 13b opposite to the lead sides of a pair of the internal electrodes 2a and 2b have substantially rectangular shapes. The other configurations are the same as that in the monolithic ceramic capacitor of the above-mentioned third preferred embodiment.

Evaluation Tests

The following tests were performed in order to evaluate the monolithic ceramic capacitor of the third preferred embodiment and the monolithic ceramic capacitors of Comparative examples 1, 2 and 3, prepared as described above.

Test 1

The monolithic ceramic capacitor of the third preferred embodiment and the monolithic ceramic capacitors of Comparative examples 1, 2 and 3 of 100 units each were immersed in a solder bath at about 400° C. at a speed of about 40 mm/s, and thereafter, occurrences of cracks were observed.

Test 2

The monolithic ceramic capacitor of the third preferred embodiment and the monolithic ceramic capacitors of Comparative examples 1, 2 and 3 of 100 units each were immersed in an aqueous solution of about 10% ammonium dihydrogen citrate kept at about 70° C. for about 24 hours, and thereafter, occurrences of cracks were observed. The results thereof are shown in Table 2.

Since Test 1 and Test 2 are accelerated tests through application of large loads, every sample exhibits a high crack occurrence rate in Table 2. However, this is a value for evaluation under the severe test condition, and therefore, this does not show a crack occurrence rate when a product is used under the usual condition.

TABLE 2

|  | Test 1 | Test 2 |
| --- | --- | --- |
| Experimental example 1 | 20/100 | 15/100 |
| Experimental example 2 | 21/100 | 32/100 |
| Experimental example 3 | 20/100 | 33/100 |
| Experimental example 4 | 42/100 | 58/100 |
| Experimental example 5 | 35/100 | 62/100 |
| Experimental example 6 | 21/100 | 22/100 |
| Comparative example 1 | 40/100 | 89/100 |
| Comparative example 2 | 80/100 | 92/100 |
| Comparative example 3 | 98/100 | 100/100 |

As is shown in Table 2, in the case of the monolithic ceramic capacitor of Comparative example 3 in which the internal electrodes 2a and 2b are substantially rectangular, occurrences of cracks were observed in substantially all capacitors in both Test 1 and Test 2.

In the case of the monolithic ceramic capacitor of Comparative example 2, provided with the internal electrodes 2a and 2b having patterns in which the tips of the end-side corner portions 13a and 13b are simply cut away, although the crack occurrence rate in Test 1 and Test 2 were smaller than that of Comparative example 3, occurrences of cracks were observed in most of capacitors.

In the case of the monolithic ceramic capacitor of Comparative example 1, in which the lead sides of a pair of the internal electrodes 2a and 2b are provided with portions (lead-side width-decreasing portions) 12a and 12b having tapered shapes, and the end-side corner portions 13a and 13b also have tapered shapes, while the length of the taper side T1 of the taper-shaped portion of the lead-side width-decreasing portion 12a (12b) of one internal electrode 2a (2b) of the internal electrodes facing each other and the length of the taper side T2 of the taper-shaped portion of the end-side corner portion 13b (13a) of the other internal electrode 2b (2a) are the same, although the crack occurrence rate in Test 1 was smaller than that of Comparative examples 3 and 2, occurrences of cracks were observed in most of capacitors in Test 2, and therefore, sufficient reliability was not achieved.

On the other hand, in the case of the monolithic ceramic capacitors of Examples 1 to 5 (T1>T2) and Example 6 (T1<T2), in which the lead-side width-decreasing portions 12a and 12b and the end-side corner portions 13a and 13b are adjusted to have tapered portions, and the length of the taper side T1 of the taper-shaped portion of the lead-side width-decreasing portion 12a (12b) of one internal electrode 2a (2b) of the internal electrodes facing each other and the length of the taper side T2 of the taper-shaped portion of the end-side corner portion 13b (13a) of the other internal electrode 2b (2a) are differentiated, the crack occurrence rates are greatly reduced in both tests of Test 1 and Test 2.

The reason for this is that, in the case of the monolithic ceramic capacitor of the third preferred embodiment, since the length of the taper side T1 of the lead-side width-decreasing portion 12a (12b) of one internal electrode 2a (2b) is different from the length of the taper side T2 of the end-side corner portion 13b (13a) of the other internal electrode 2b (2a), even when the capacitor-forming portions Ca and Cb of a pair of the internal electrodes 2a and 2b directly face each other, the taper-shaped portions of the lead-side width-decreasing portions 12a and 12b and the taper-shaped portions of the end-side corner portions 13a and 13b do not directly face each other, and occurrence of residual stress after firing is effectively suppressed.

As described above, in the monolithic ceramic capacitor of the third preferred embodiment, occurrence of the residual stress is effectively suppressed or prevented without sacrificing available capacitance, and occurrence of internal defect, e.g. peeling, is prevented. In the monolithic ceramic capacitor of the third preferred embodiment, since the widths of the lead portions of the internal electrodes 2a and 2b are less than the width of the capacitor-forming portion, entrance of water from the outside is suppressed, and thereby, the reliability is greatly improved.

In Table 2, the crack occurrence rates of Experimental example 4 in Tests 1 and 2 are relatively large as compared to that of Experimental examples 1 to 3 and Experimental example 6. The reason for this is believed to be the length of the sides forming a right angle of substantially rectangular isosceles triangles cut away to form the end-side corner portions 13a and 13b of the monolithic ceramic capacitor in Experimental example 4 are about 40 μm, and therefore, T2 is relatively small.

The crack occurrence rates of Experimental example 5 in Tests 1 and 2 are relatively large as compared to that of Experimental examples 1 to 3 and Experimental example 6. The reason for this is believed to be that the sizes of the taper sides T1 of the lead-side width-decreasing portions 12a and 12b of the monolithic ceramic capacitor in Experimental example 5 and the sizes of the taper sides T2 of the end-side corner portions 13b and 13a are relatively close to each other.

Consequently, it is clear that the crack occurrence rate is further reduced by adjusting T2 to be in the order of at least about 100 μm, as in Experimental examples 1 to 3 and Experimental example 6 (when T2=57 μm, the crack occurrence rates in Tests 1 and 2 are high in Experimental example 4, and when T2=113 μm, the crack occurrence rates in Tests 1 and 2 are low in Experimental example 3), and adjusting the difference in dimensions between the taper sides T1 and T2 to be in the order of at least about 100 μm (when the difference in dimensions between the taper sides T1 and T2 is adjusted to be about 57 μm, the crack occurrence rates in Tests 1 and 2 are high in Experimental example 5, and when the difference in dimensions between the taper sides T1 and T2 is adjusted to be 113 μm, the crack occurrence rates in Tests 1 and 2 are low in Experimental examples 2 and 6).

Fourth Preferred Embodiment

Figure 7A:
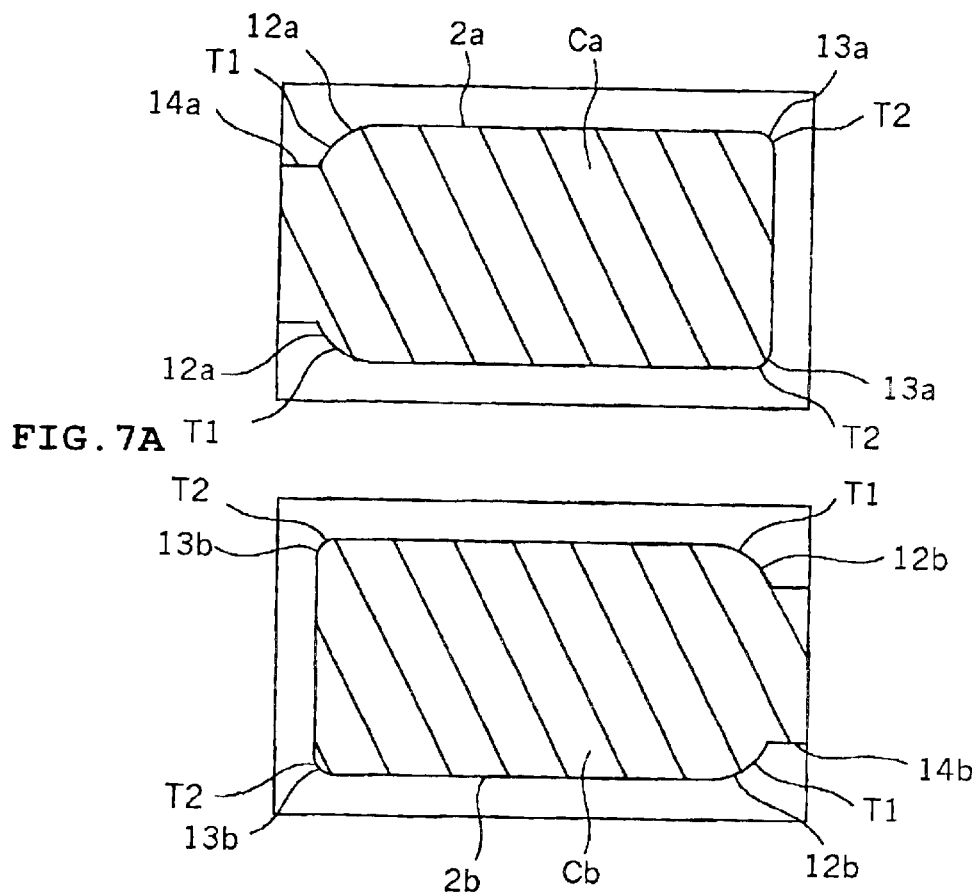
FIG. 7A is a plan view showing patterns of a pair of internal electrodes of the monolithic ceramic capacitor according to a fourth preferred embodiment of the present invention.
Figure 7B:
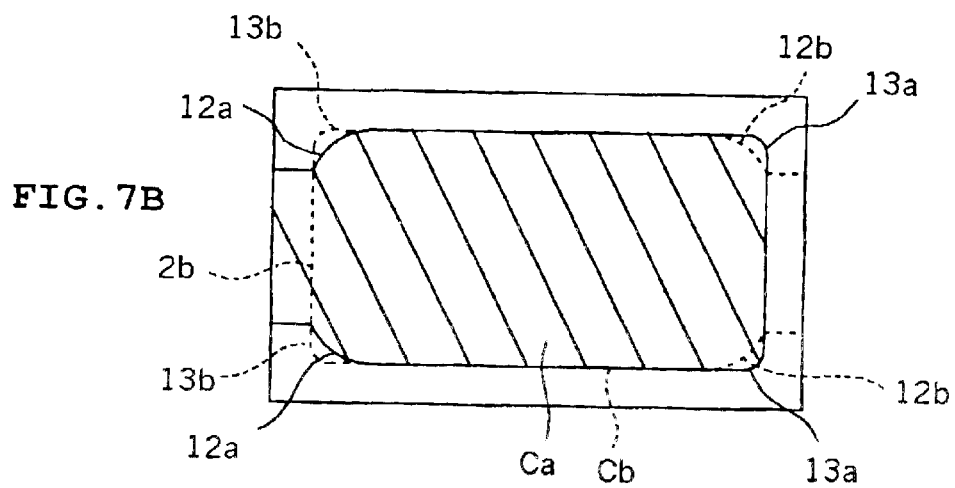
FIG. 7B is a plan view showing the overlapping state of the internal electrodes.

FIGS. 7A and 7B are diagrams showing the configuration of key portion of a laminated ceramic electronic component (a monolithic ceramic capacitor in the present preferred embodiment) according to another embodiment (the fourth preferred embodiment) of the present invention. FIG. 7A is a plan view showing patterns of internal electrodes, and FIG.

7B is a plan view showing the overlapping state of the internal electrodes.

In the monolithic ceramic capacitor of this fourth preferred embodiment, a pair of internal electrodes 2a and 2b facing each other which are alternately led out to opposed end surfaces of the ceramic element 1, are discussed, the lead sides of a pair of the internal electrodes 2a and 2b are provided with portions (lead-side width-decreasing portions) 12a and 12b having rounded shapes with a width gradually decreasing with increasing proximity to the lead-side end surface of the ceramic element 1, and the end-side corner portions 13a and 13b opposite to the lead sides of a pair of the internal electrodes 2a and 2b have rounded shapes.

Furthermore, parallel portions 14a and 14b, which have widths less than that of capacitor-forming portions Ca and Cb of the internal electrodes 2a and 2b and which are parallel to the leading direction of the internal electrodes 2a and 2b, are provided in the side closer to the end (the lead-side end surface of the ceramic element 1) than are the lead-side width-decreasing portions 12a and 12b.

The radius of curvature of the lead-side width-decreasing portion 12a (12b) of one internal electrode 2a (2b) of the internal electrodes facing each other is configured to be greater than the radius of curvature of the end-side corner portion 13b (13a) of the other internal electrode. However, the dimensional relationship between the radii of curvatures may be reversed.

By configuring the lead-side width-decreasing portions 12a and 12b and the end-side corner portions 13a and 13b to have the rounded shapes with predetermined radii of curvatures, and differentiating the radius of curvature of the lead-side width-decreasing portion 12a (12b) of one internal electrode 2a (2b) of the internal electrodes facing each other from the radius of curvature of the end-side corner portion 13b (13a) of the other internal electrode 2b (2a) as in the fourth preferred embodiment, effects similar to that of the monolithic ceramic capacitor in the above-mentioned third preferred embodiment are achieved.

That is, in the monolithic ceramic capacitor according to the fourth preferred embodiment, even when the capacitor-forming portions Ca and Cb of a pair of the internal electrodes 2a and 2b directly face each other, the lead-side width-decreasing portions 12a and 12b and the end-side corner portions 13a and 13b are reliably prevented from directly facing each other, and therefore, occurrence of the residual stress is suppressed or prevented.

Figure 11:
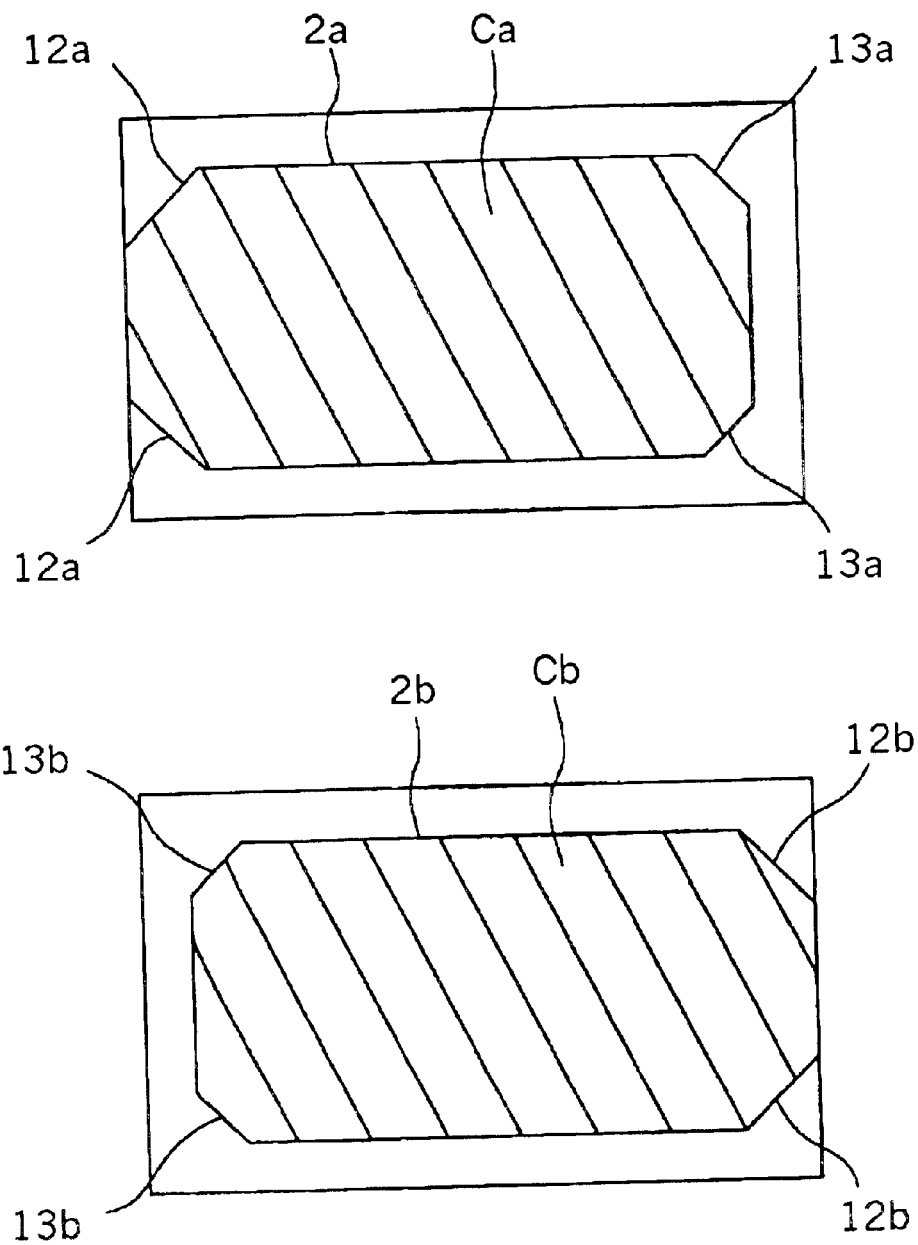
FIG. 11 is a diagram showing a first modified example of the monolithic ceramic capacitors related to the third and fourth preferred embodiments of the present invention.
Figure 12:
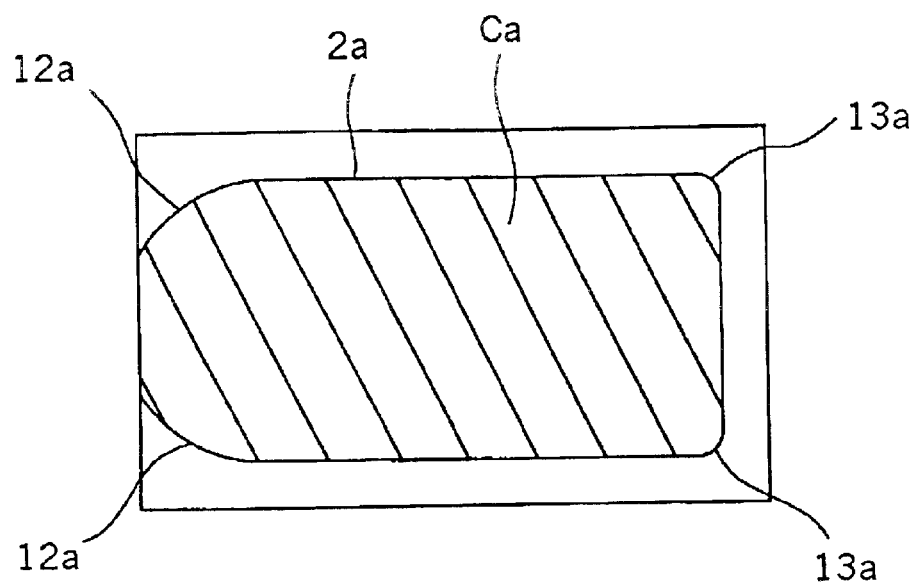
FIG. 12 is a diagram showing a second modified example of the monolithic ceramic capacitors related to the third and fourth preferred embodiments of the present invention.
Figure 12:
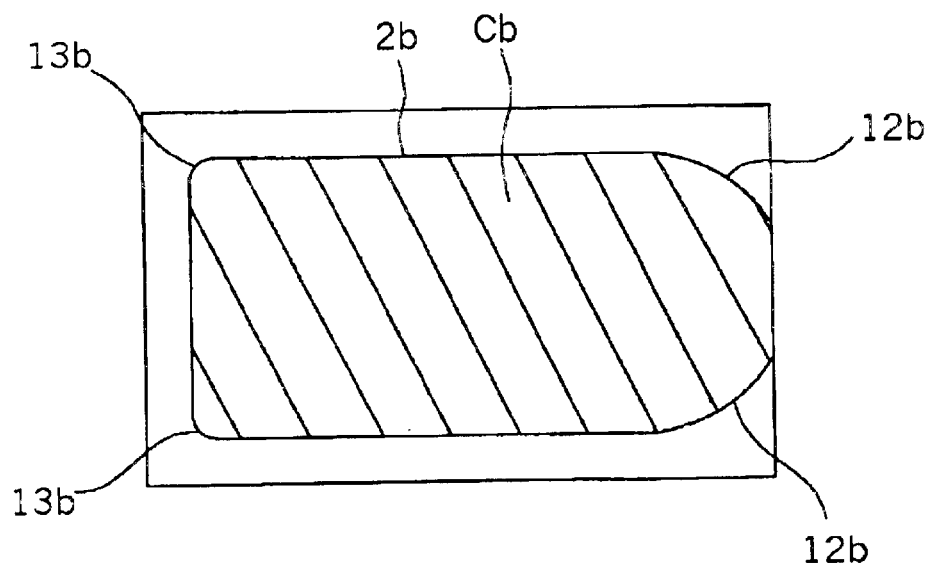

In the above-described third and fourth preferred embodiments, the description was made with reference to the case where the parallel portions 14a and 14b, which have widths Less than that of capacitor-forming portions Ca and Cb of the internal electrodes 2a and 2b and which are substantially parallel to the leading direction of the internal electrodes 2a and 2b, are provided in the side nearer to the end than are the lead-side width-decreasing portions 12a and 12b. However, for example, as shown in FIG. 11 and FIG. 12, a shape in which no parallel portion is provided in the side nearer to the end than are the lead-side width-decreasing portions 12a and 12b may be adopted.

Figure 13:
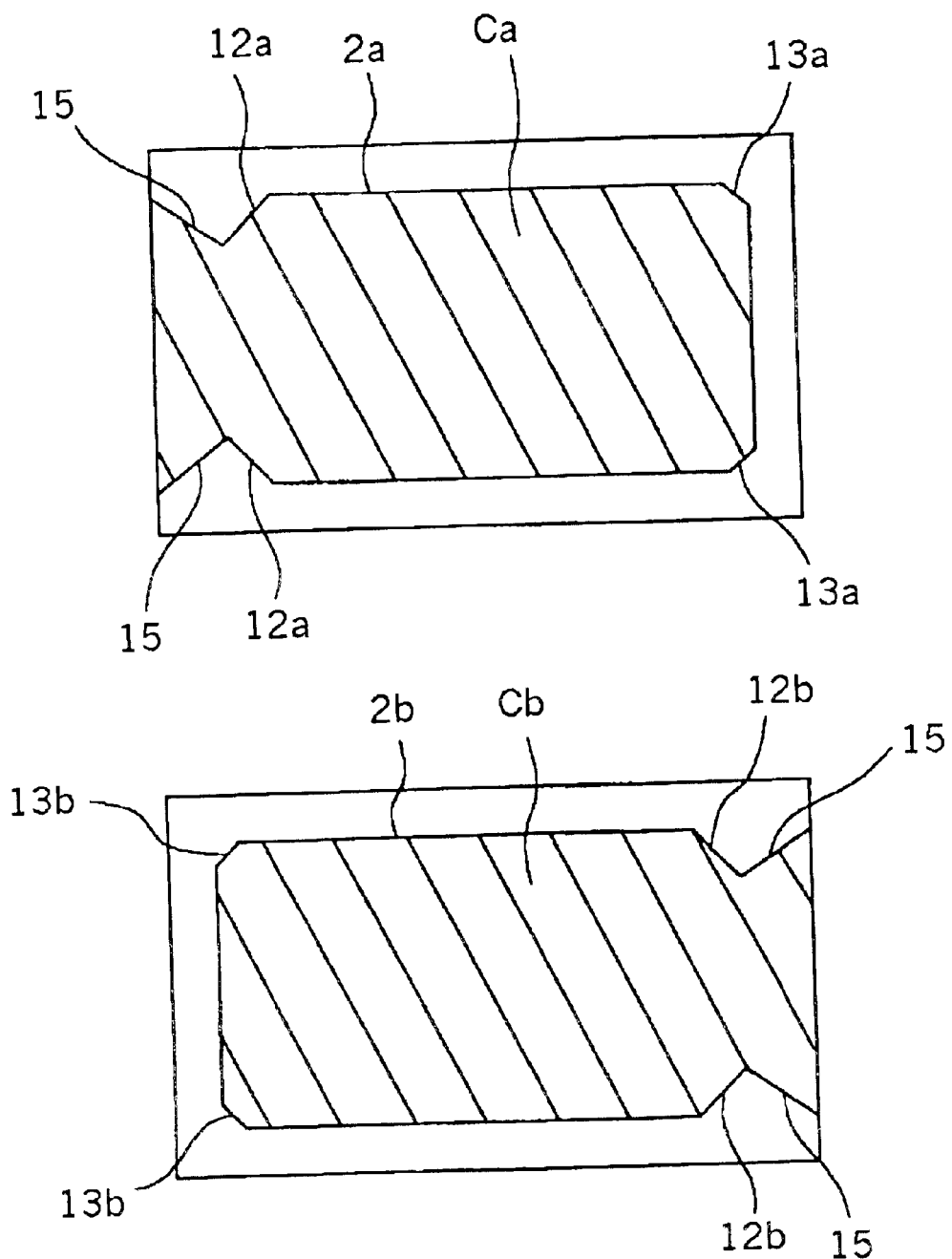
FIG. 13 is a diagram showing a third modified example of the monolithic ceramic capacitors related to the third and fourth preferred embodiments of the present invention.

As shown in FIG. 13, a width-increasing portion 15, in which the width gradually increases with increasing proximity to lead-side end surface of the ceramic element 1, is provided in the side nearer to the end than are the lead-side width-decreasing portions 12a and 12b.

In every preferred embodiment, the description was made with reference to the monolithic ceramic capacitor. However, the present invention can be widely applied to various laminated ceramic electronic components, e.g. laminated varistors and laminated LC composite components, having a structure in which a plurality of internal electrodes are provided by lamination with a ceramic layer therebetween in a ceramic element.

The present invention is not limited to the above-described third and fourth preferred embodiments with respect to other points. Various applications and modifications within the scope of the present invention can be performed with respect to specific shapes of the lead-side width-decreasing portion and the end-side corner portion of the internal electrode, the dimension of the ceramic element, the number of lamination of internal electrode layers, the constituent materials of the internal electrode, the type of the ceramic used as a dielectric material, and the arrangement position and the pattern of the external electrode.

The present invention further includes the following configurations and manufacturing methods (3-1) to (3-4).

(3-1): A laminated ceramic electronic component includes a plurality of internal electrodes facing each other with a ceramic layer therebetween that are provided in a ceramic element, and the internal electrodes facing each other are alternately led out to opposed end surfaces of the ceramic element so that the internal electrodes are connected to external electrodes provided on the end surfaces. The lead portion of the internal electrode is adjusted to have a shape provided with a taper-shaped portion in which the width gradually decreases with increasing proximity to the end surface of the ceramic element, the angle θ between the end surface of the ceramic element and the taper-shaped portion of the internal electrode is within the range of about 40° to about 80° in the plan view, and the width W of the lead portion of the internal electrode on the ceramic element end surface is within the range of about two-thirds to about three-quarters the width $W_0$ of the internal electrode main portion.

Therefore, entrance of water from the outside, occurrence of peeling and other problems are suppressed or prevented, and in addition, the thermal shock resistance and the mechanical shock resistance are greatly improved, such that the reliability is greatly improved.

Preferably, the angle θ between the end surface of the ceramic element and the taper-shaped portion of the internal electrode is within the range of about 40° to about 80° in the plan view. The reason for this is that if the angle θ is less than about 40°, the thermal shock resistance and the mechanical shock resistance are reduced, and if the angle θ exceeds about 80°, entrance of water from the outside and peeling are more likely to occur.

Preferably, the width W of the lead portion of the internal electrode on the end surface of the ceramic element is within the range of about two-thirds to about three-quarters the width $W_0$ of the internal electrode main portion. The reason for this is that if the width W is less than about two-thirds the width $W_0$, the effect of improving the thermal shock resistance and the mechanical shock resistance is insufficient and, in addition, reliability in conduction is degraded, and if the width W exceeds about three-quarters the width $W_0$, entrance of water from the outside and peeling are more likely to occur.

(3-2): In the laminated ceramic electronic component, the angle θ between the end surface of the ceramic element and the taper-shaped portion of the internal electrode is within the range of about 60° to about 80° in the plan view.

Therefore, entrance of water from the outside, occurrence of peeling and other problems are suppressed or prevented, and in addition, the thermal shock resistance and the mechanical shock resistance are greatly improved, such that the reliability is further improved.

(3-3): A method for manufacturing a laminated ceramic electronic component having a structure, in which a plurality of internal electrodes facing each other with a ceramic layer therebetween are provided in a ceramic element, and the internal electrodes facing each other are alternately led out to opposed end surfaces of the ceramic element such that the internal electrodes are connected to external electrodes provided on the end surfaces, includes the step of laminating ceramic green sheets provided with the internal electrode pattern in which the lead portion of the internal electrode has the shape provided with a taper-shaped portion having the width gradually decreasing with increasing proximity to the end surface of the ceramic element, the angle θ between the end surface of the ceramic element and the taper-shaped portion of the internal electrode is within the range of about 40° to about 80° in the plan view, and the width W of the lead portion of the internal electrode on the end surface of the ceramic element is within the range of about two-thirds to about three-quarters the width $W_0$ of the internal electrode main portion, followed by pressure-bonding so as to form a laminate, the step of firing the above-mentioned laminate, and the step of forming external electrodes electrically connected to the lead portions of the internal electrodes made by firing the above-mentioned internal electrode patterns, in regions including both end surfaces of the above-mentioned fired laminate.

Therefore, entrance of water from the outside, occurrence of peeling and other problems are suppressed or prevented, and therefore, a highly reliable laminated ceramic electronic component having excellent thermal shock resistance and mechanical shock resistance is efficiently manufactured.

(3-4): In the method for manufacturing a laminated ceramic electronic component, the angle θ between the end surface of the ceramic element and the taper-shaped portion of the internal electrode is adjusted to be about 60° to about 80° in the plan view.

Therefore, entrance of water from the outside, occurrence of peeling and other problems are suppressed or prevented, and therefore, a highly reliable laminated ceramic electronic component having excellent thermal shock resistance and mechanical shock resistance is further efficiently manufactured with reliability.

The configurations and manufacturing methods (3-1) to (3-4) will be described below in further detail.

Fifth Preferred Embodiment

In the fifth preferred embodiment, as is illustrated by a perspective, exploded view shown in FIG. 15 and by a sectional view shown in FIG. 16, the description will be made with reference to a laminated ceramic electronic component (monolithic ceramic capacitor) having a structure in which a plurality of internal electrodes 2 facing each other with a ceramic layer 3 therebetween are provided in a ceramic element 1 (FIG. 16), and the internal electrodes 2 facing each other are alternately led out to opposed end surfaces of the ceramic element 1 so that the internal electrodes are connected to a pair of external electrodes 4 provided on the end surfaces.

(1) When this monolithic ceramic capacitor was manufactured, a barium titanate-based material as a ceramic raw material powder, a resin binder, a plasticizer and a solvent were mixed and dispersed, such that a ceramic slurry was prepared.

(2) Ceramic green sheets of about 3 μm in thickness were prepared using this ceramic slurry.

Figure 14A:
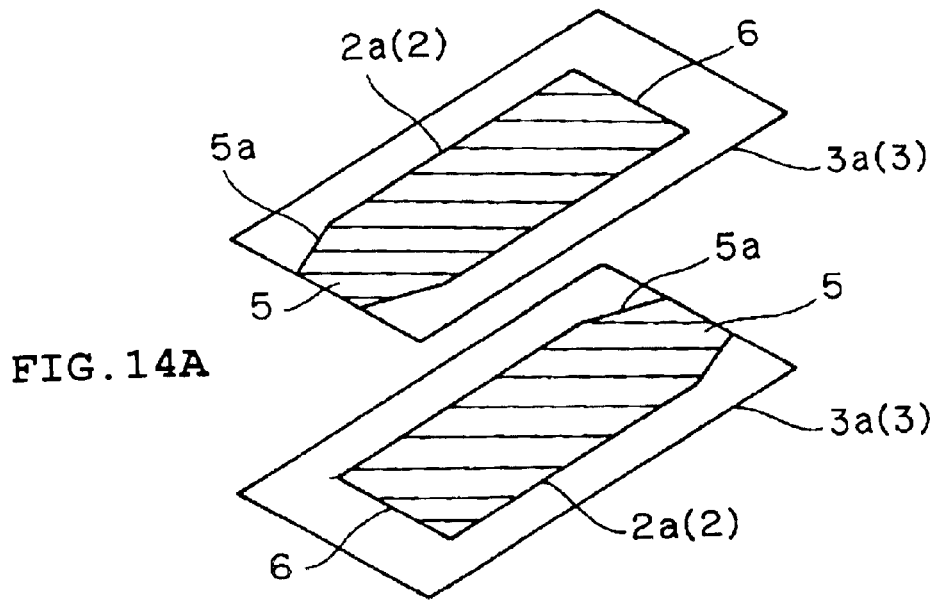
FIGS. 14A and 14B are diagrams showing internal electrodes constituting a monolithic ceramic capacitor according to a preferred embodiment of the present invention.
Figure 14B:
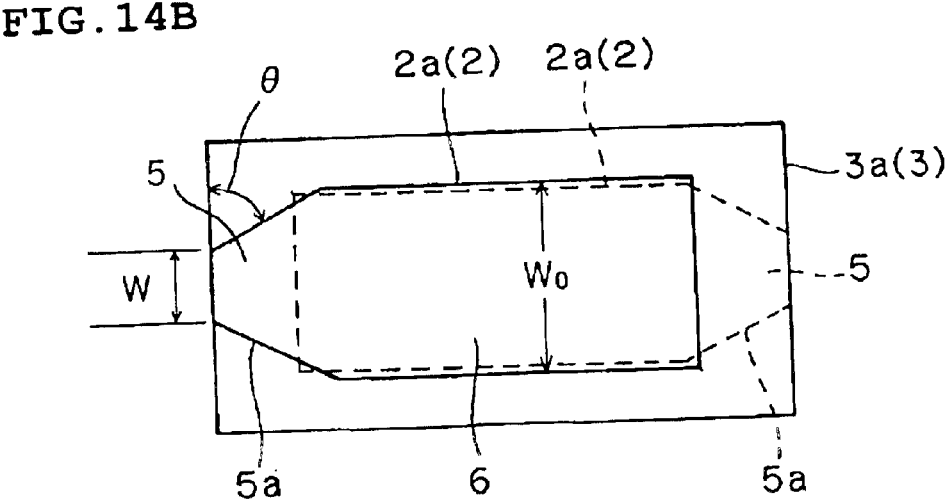

(3) A conductive paste including a base metal powder as a conductive component was screen-printed on this ceramic green sheet, and thereby, a ceramic green sheet 3a provided with an internal electrode pattern 2a having a predetermined shape, as shown in FIGS. 14A and 14B, was formed. The internal electrode pattern 2a had a shape provided with a taper-shaped portion 5a in which the width of a lead portion 5 was gradually decreased with increasing proximity to the end portion of the ceramic element 1 (FIG. 16).

A ceramic green sheet 3a was prepared such that the angle θ between the end portion of the ceramic green sheet 3a (end surface of the ceramic element 1 (FIG. 16)) and the taper-shaped portion 5a of the lead portion 5 of the internal electrode pattern 2a (internal electrode 2) was about 30°, 40°, 50°, 60°, 70°, 80° or 85° in the plan view (Sample Nos. 1 to 7 in Table 3). In addition, a ceramic green sheet having a conventional pattern was prepared, in which the angle θ was about 90° and the width of the lead portion was the same as that of the internal electrode main portion (Sample No. 8 in Table 3). Furthermore, a ceramic green sheet was prepared so as to have a pattern, in which the angle θ was about 90° and the width of the lead portion was about three-quarters that of the internal electrode main portion (Sample No. 9 in Table 3).

Figure 15:
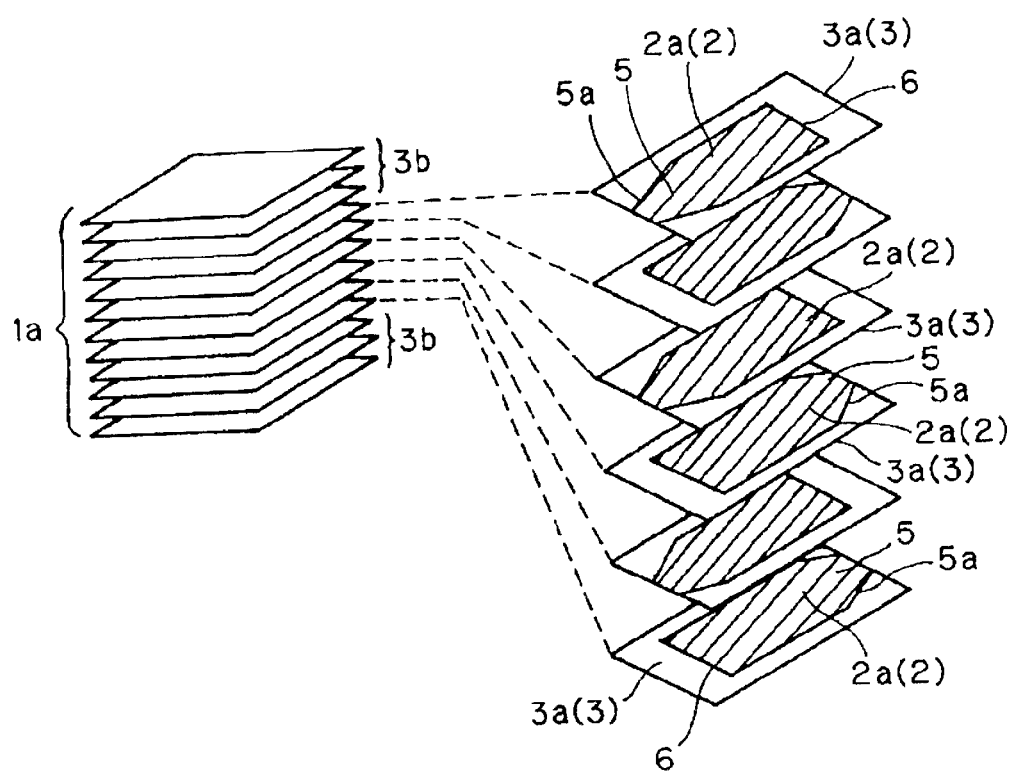
FIG. 15 is a perspective, exploded view for illustrating the configuration and manufacturing method of a monolithic ceramic capacitor according to a preferred embodiment of the present invention.

(4) As shown in FIG. 15, the ceramic green sheets 3a (300 sheets) provided with the internal electrode patterns 2a (internal electrodes 2) and ceramic green sheets (dummy sheets) 3b provided with no internal electrode pattern were laminated. The resulting laminate was pressed, and thereafter, was cut to have a product dimensions of approximately 3.2 mm long×1.6 mm wide×1.6 mm high, such that unfired ceramic element 1a was produced.

(5) Subsequently, degreasing was performed, and furthermore, firing was performed in a furnace under controlled atmosphere of $N_2+H_2$ ($H_2=5\%$) at a temperature of about 1,300° C.

Figure 16:
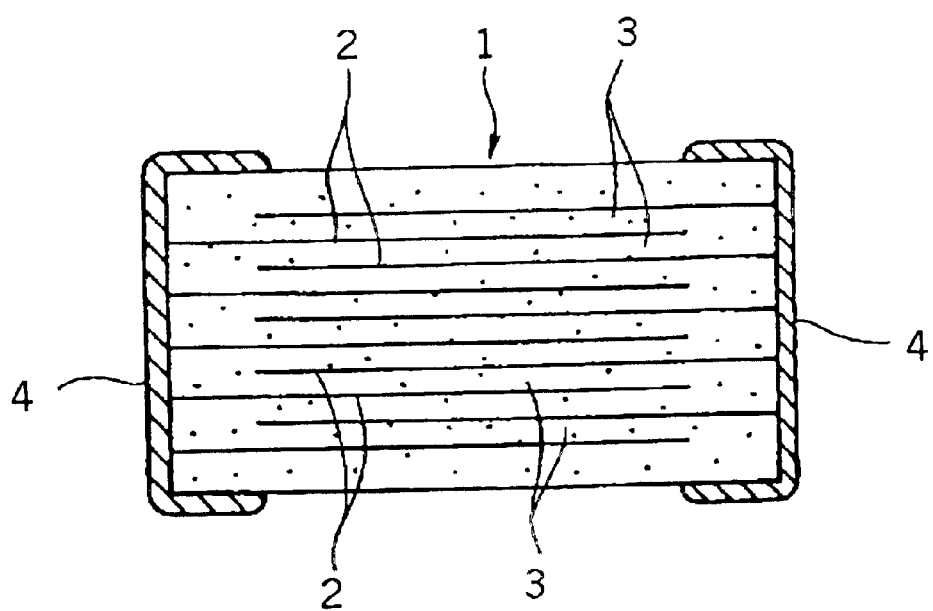
FIG. 16 is a sectional view showing a monolithic ceramic capacitor manufactured by a method for manufacturing a monolithic ceramic capacitor according to a preferred embodiment of the present invention.

(6) After the firing, as shown in FIG. 16, a Cu paste was applied on both ends of the ceramic element 1, followed by baking. Ni plating and Sn plating were successively applied thereon, and therefore, a pair of external electrodes 4 was formed.

In this manner, as shown in FIG. 16, a monolithic ceramic capacitor was prepared to have a structure in which a plurality of internal electrodes 2 were laminated with the ceramic layer 3 therebetween in the ceramic element 1, and the internal electrodes 2 facing each other with the ceramic layer 3 therebetween were alternately led out to opposed end surfaces of the ceramic element 1 so that the internal electrodes are connected to external electrodes 4 provided on the end surfaces.

With respect to the monolithic ceramic capacitor prepared as described above, an observation of the presence or absence of the structural defect (peeling defect) after firing, a crack accelerated evaluation, and a thermal shock test were performed, and thereby, characteristics were examined.

The presence or absence of a structural defect after firing was verified by observing peeling defect in the lead portion of the internal electrode.

The crack accelerated evaluation was performed by examining degradation of IR (Insulation Resistance) based on a PCT test (high-temperature load test) of exposure to high-temperature high-pressure steam for about 50 hours.

The thermal shock test was performed by immersing the monolithic ceramic capacitor in solder at about 300° C. or about 350° C. and examining occurrence or no occurrence of crack.

The results thereof are shown in Table 3.

TABLE 3

| Sample No. | Angle θ (°) | W/W$_0$ | Peeling defect occurrence rate in lead portion of internal electrode (ppm) | IR degradation rate based on PCT test (%) | Defect occurrence rate based on thermal shock test ΔT | |
|---|---|---|---|---|---|---|
| | | | | | 300° C. | 350° C. |
| 1* | 30 | 3/4 | 0.1> | 0.10 | 1/100 | 10/100 |
| 2 | 40 | 3/4 | 0.05> | 0.0 | 1/100 | 3/100 |
| 3 | 50 | 3/4 | 0.03> | 0.0 | 0/100 | 2/100 |
| 4 | 60 | 3/4 | 0.01> | 0.0 | 0/100 | 1/100 |
| 5 | 70 | 3/4 | 0.01> | 0.0 | 0/100 | 0/100 |
| 6 | 80 | 3/4 | 0.02> | 0.0 | 0/100 | 1/100 |
| 7* | 85 | 3.5/4 | 50 | 0.10 | 1/100 | 3/100 |
| 8* | 90 | 4/4 | 100 | 0.15 | 1/100 | 5/100 |
| 9* | 90 | 3/4 | 50> | 0.10 | 2/100 | 8/100 |

In Table 3, asterisked sample numbers indicate samples which are outside of the scope of the present invention.

In the fifth preferred embodiment, regarding Sample Nos. 1 to 6, the width W of the lead portion of the internal electrode on the end surface of the ceramic element was set to be about three-quarters the width $W_0$ of the internal electrode main portion 6 (W/W$_0$=3/4). However, Sample Nos. 7 and 8, in which the angles θ were too large, were unable to satisfy the condition W/W$_0$=3/4, and therefore, the ratios were adjusted to be the values shown in Table 3 (when the angle θ was 85°, W/W$_0$=3.5/4, and when the angle θ was 90°, W/W$_0$=4/4).

Regarding Sample No. 9, the width W of the lead portion was adjusted to be about three-quarters the width $W_0$ of the internal electrode main portion 6 without having the tapered shape.

As is clear from Table 3, regarding samples according to examples of various preferred embodiments of the present invention of Sample Nos. 2 to 6, in which the angles θ are about 40°, 50°, 60°, 70° and 80°, all of the peeling defect occurrence rate in the lead portion of the internal electrode, the IR degradation rate based on the PCT test and the defect occurrence rate based on the thermal shock test are small, and therefore, monolithic ceramic capacitors having high reliability are produced. In particular, it is clear that monolithic ceramic capacitors having high reliability are produced with respect to Sample Nos. 4, 5 and 6, in which the angles θ are about 60° to about 80°.

On the other hand, regarding the sample of Sample No. 1 in which the angle θ is about 30° and samples of Sample Nos. 7 and 8, in which the angles θ are about 85° and about 90° respectively, it is clear that the peeling defect occurrence rates in the lead portions of the internal electrodes, the IR degradation rates based on the PCT test and the defect occurrence rates based on the thermal shock test are large, and therefore, no monolithic ceramic capacitor having high reliability is produced.

Likewise, regarding Sample No. 9 in which the width of the lead portion is adjusted to be less (three-quarters times) than the width of the internal electrode main portion without having the tapered shape (θ=90°), it is clear that the peeling defect occurrence rate, the IR degradation rate based on the PCT test and the defect occurrence rate based on the thermal shock test are large, and therefore, no monolithic ceramic capacitor having high reliability is produced.

Sixth Preferred Embodiment

In a manner similar to that in the above-mentioned fifth preferred embodiment, various samples (monolithic ceramic capacitors) of Sample Nos. of 11 to 33 were prepared, in which the angles θ were adjusted to be about 35°, 40°, 60°, 70° 80° and 85°, and W/W$_0$ was changed, and the relationship between the ratio of the width W of the lead portion 5 of the internal electrode 2 to the width $W_0$ of the internal electrode main portion 6, W/W$_0$, the angle θ and the characteristics was examined. In the sixth preferred embodiment as well, the observation of the presence or absence of structural defects (peeling defect) after firing, the crack accelerated evaluation, and the thermal shock test were performed in a manner similar to that in the above-mentioned fifth embodiment, and thereby, characteristics were examined.

The results thereof are shown in Table 4.

TABLE 4

| Sample No. | Angle θ (°) | W/W$_0$ | Peeling defect occurrence rate in lead portion of internal electrode (ppm) | IR degradation rate based on PCT test (%) | Defect occurrence rate based on thermal shock test ΔT | |
|---|---|---|---|---|---|---|
| | | | | | 300° C. | 350° C. |
| 11* | 35 | 2/3 | 50 | 1.5% | 5/100 | 40/100 |
| 12* | 35 | 3/4 | 50 | 1.5% | 5/100 | 35/100 |
| 13* | 40 | 1/4 | 10 | 0.1% | 4/100 | 20/100 |
| 14* | 40 | 1/3 | 8 | 0.1% | 3/100 | 15/100 |
| 15* | 40 | 1/2 | 7 | 0.1% | 3/100 | 4/100 |
| 16 | 40 | 2/3 | 1> | 0.0% | 1/100 | 1/100 |
| 17 | 40 | 3/4 | 1> | 0.0% | 1/100 | 1/100 |
| 18* | 60 | 1/4 | 5> | 0.1% | 2/100 | 15/100 |
| 19* | 60 | 1/3 | 3> | 0.1% | 1/100 | 12/100 |
| 20* | 60 | 1/2 | 2> | 0.0% | 0/100 | 3/100 |
| 21 | 60 | 2/3 | 0.1> | 0.0% | 0/100 | 0/100 |
| 22 | 60 | 3/4 | 0.1> | 0.0% | 0/100 | 0/100 |
| 23* | 70 | 1/4 | 1> | 0.1% | 1/100 | 10/100 |
| 24* | 70 | 1/3 | 0.5> | 0.1% | 1/100 | 10/100 |
| 25* | 70 | 1/2 | 2> | 0.0% | 0/100 | 1/100 |
| 26 | 70 | 2/3 | 0.05> | 0.0% | 0/100 | 0/100 |
| 27 | 70 | 3/4 | 0.05> | 0.0% | 0/100 | 0/100 |
| 28* | 80 | 1/4 | 1> | 0.1% | 2/100 | 20/100 |
| 29* | 80 | 1/3 | 1> | 0.1% | 1/100 | 15/100 |
| 30* | 80 | 1/2 | 2 | 0.0% | 0/100 | 1/100 |
| 31 | 80 | 2/3 | 0.1> | 0.0% | 0/100 | 0/100 |
| 32 | 80 | 3/4 | 0.1> | 0.0% | 0/100 | 0/100 |
| 33* | 85 | 3.5/4 | 50 | 1.0% | 4/100 | 10/100 |

In Table 4, asterisked sample numbers indicate samples which are out of the scope of the present invention.

As is clear from Table 4, regarding each sample (samples of Sample Nos. 16, 17, 21, 22, 26, 27, 31 and 32) satisfying the requirements of the present invention, in which the angle θ between the end surface of the ceramic element and the taper-shaped portion of the internal electrode is within the range of about 40° to about 80°, and the ratio (W/W$_0$) of the width W of the lead portion 5 of the internal electrode 2 to the width $W_0$ of the internal electrode main portion 6 is within the range of about two-thirds to about three-quarters, all of the peeling defect occurrence rate in the lead portion of the internal electrode, the IR degradation rate based on the PCT test and the defect occurrence rate based on the thermal shock test are small, and therefore, a monolithic ceramic capacitor having high reliability is produced. In particular, it is clear that a monolithic ceramic capacitor having high reliability is produced with respect to each of Sample Nos. 21, 22, 26, 27, 31 and 32, in which the angle θ is about 60° to about 80°, and W/W$_0$ is about two-thirds to about three-quarters.

On the other hand, regarding samples in which any one of the angle θ and W/W$_0$ does not satisfy the requirement of the present invention (samples indicated by asterisked sample numbers), it is clear that at least one of the peeling defect occurrence rate, the IR degradation rate based on the PCT test and the defect occurrence rate based on the thermal shock test is large, and therefore, no monolithic ceramic capacitor having high reliability is produced.

Seventh Preferred Embodiment

Figure 17A:
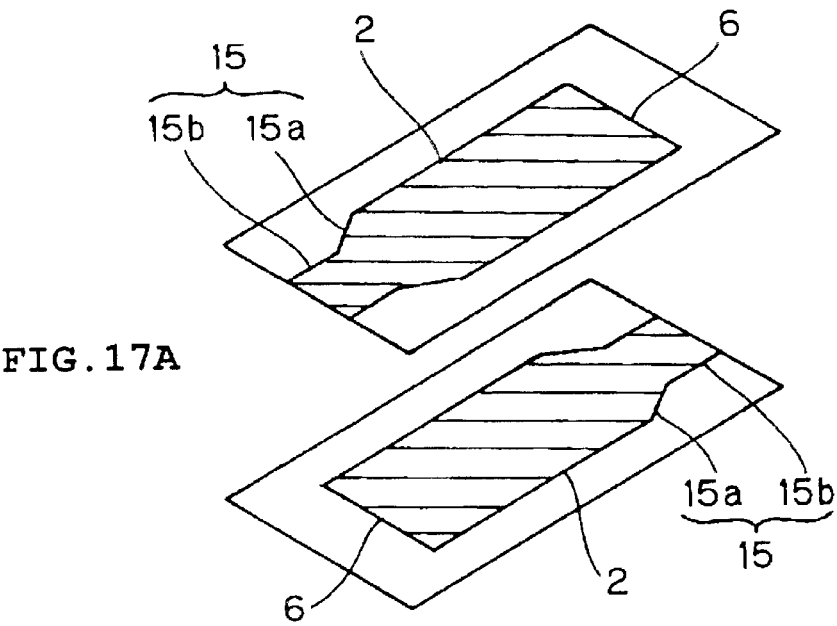
FIGS. 17A and 17B are diagrams showing internal electrodes constituting a monolithic ceramic capacitor according to another preferred embodiment of the present invention.
Figure 17B:
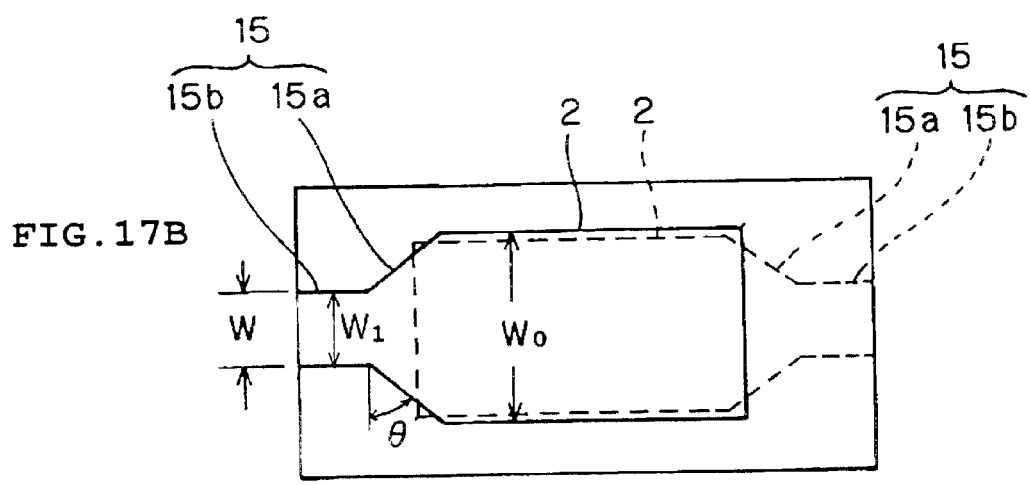
Figure 18:
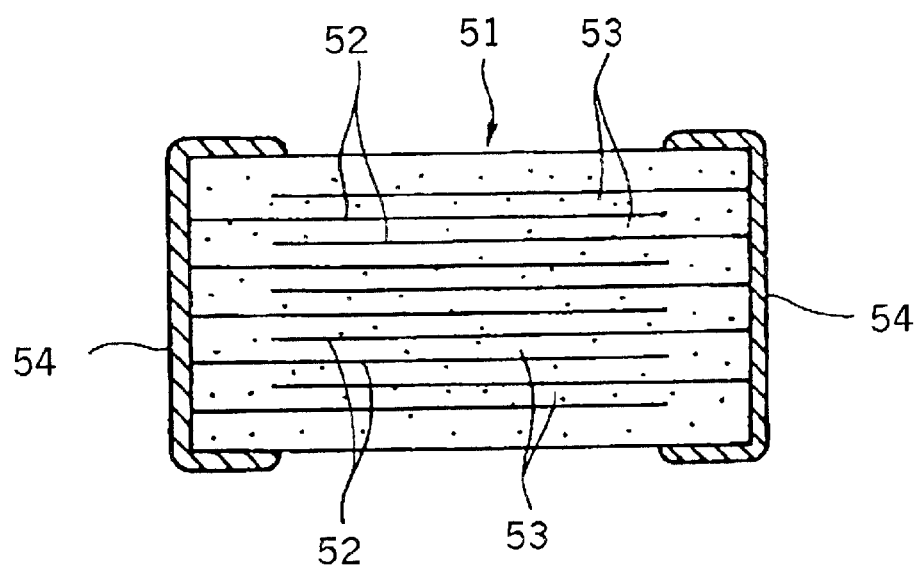
FIG. 18 is a sectional view of a conventional monolithic ceramic capacitor.

FIGS. 17A and 17B are diagrams showing a laminated ceramic electronic component (monolithic ceramic capacitor) according to a seventh preferred embodiment of the present invention. FIG. 17A is a perspective view showing the shape of a pair of internal electrodes, and FIG. 17B is a plan view showing the overlapping state of a pair of the internal electrodes. In FIGS. 17A and 17B, the portion indicated by the same reference numeral as in FIGS. 14A and 14B denotes the same or a corresponding portion.

In the seventh preferred embodiment, as shown in FIGS. 17A and 17B, a lead portion 15 of an internal electrode 2 is configured to have a shape provided with a taper-shaped portion 15a in which the width gradually decreases with increasing proximity to the end side, and in addition, a parallel portion 15b having a width $W_1$, which is formed in the side nearer to the end than is the taper-shaped portion 15a and which is parallel to the leading direction. In the seventh preferred embodiment, the width $W_1$ of the parallel portion 15b is the same as the width W of the lead portion of the internal electrode 2.

Even when the internal electrode 2 has the shape, as shown in FIGS. 17A and 17B, provided with the taper-shaped portion 15a and the parallel portion 15b, as in the monolithic ceramic capacitor of the seventh preferred embodiment, effects equivalent to that of the monolithic ceramic capacitor in the above-mentioned fifth preferred embodiment are achieved by satisfying the requirements of the present invention with respect to the angle θ of the taper-shaped portion 15 (FIG. 17B) and $W/W_0$.

The present invention is not limited to the above-mentioned fifth, sixth and seventh preferred embodiments, and for example, the taper-shaped portion may be curved. Furthermore, the shape of details of the internal electrode is not specifically limited, and the corner portion may be somewhat rounded. Various applications and modifications within the scope of the invention can be performed with respect to the type of the conductive paste applied as the internal electrode pattern, the specific shape of the printing pattern (internal electrode pattern), the type of the ceramic used as a dielectric material, the number of lamination of internal electrode layers, and the arrangement position and the pattern of the external electrode.

What is claimed is:

1. A laminated ceramic electronic component comprising:
   a ceramic element;
   a plurality of internal electrodes provided in said ceramic element, said plurality of internal electrodes face each other with a ceramic layer disposed therebetween, said internal electrodes facing each other extend to respective end surfaces of a pair of end surfaces of the ceramic element through respective lead portions extending from the respective internal electrode main portions such that the internal electrodes are connected to respective external electrodes of a pair of the external electrodes provided on the pair of end surfaces; wherein
   each internal electrode of a pair of internal electrodes of said plurality of internal electrodes has a two-dimensional shape including at least one corner portion in the main portion and a portion having a width that gradually decreases in one direction in a portion of the internal electrode which extends from the main portion; and
   a positional relationship between the pair of internal electrodes is at least one of:
   a corner portion of one internal electrode of the pair of the internal electrodes and a portion of the other internal electrode having a width gradually decreasing in one direction, are in close proximity to each other with the ceramic layer therebetween while the corner portion of the one internal electrode does not overlap the other internal electrode; and
   a corner portion of the other internal electrode and a portion of the one internal electrode having a width that gradually decreases in one direction, are in close proximity to each other with the ceramic layer therebetween while the corner portion of the other internal electrode does not overlap the one internal electrode.

2. The laminated ceramic electronic component according to claim 1, wherein the portion having a width that gradually decreases in one direction is located in the lead portion of the internal electrode, and the corner portion is located in a portion opposite to the lead portion with the center of the internal electrode main portion therebetween.

3. The laminated ceramic electronic component according to claim 2, wherein the width of the portion having a width that gradually decreases in one direction decrease linearly.

4. The laminated ceramic electronic component according to claim 3, wherein the width of the portion having a width that gradually decreases in one direction decreases at an angle of about 40 degrees to about 80 degrees.

5. The laminated ceramic electronic component according to claim 3, wherein the width of the portion having a width that gradually decreases in one direction decreases at an angle of about 60 degrees to about 80 degrees.

6. The laminated ceramic electronic component according to claim 1, wherein the external electrode-side width of the portion having a width that gradually decreases in one direction is about two-thirds to about three-quarters the width of the internal electrode main portion.

7. A method for manufacturing a laminated ceramic electronic component having the structure according to claim 1, comprising the steps of:
   applying a conductive paste on one surface of a ceramic green sheet by a screen printing method to provide an electrode pattern having the shape according to claim 1 on the ceramic green sheet surface; and
   laminating a plurality of the ceramic green sheets such that a pair of internal electrodes facing each other with the ceramic layer therebetween have the positional relationship according to claim 1.

8. The method for manufacturing a laminated ceramic electronic component according to claim 7, wherein at least one of the pair of internal electrodes includes the corner portion located in one portion at which two sides of the internal electrode main portion are in contact with each other, and the portion having a width that gradually decreases in one direction located in the lead portion.

9. The method for manufacturing a laminated ceramic electronic component according to claim 7, further comprising the steps of:
   applying a conductive paste including Cu to end surface of the ceramic element; and
   applying Ni plating and Sn plating on the conductive paste to form external electrodes.

10. The laminated ceramic electronic component according to claim 1, wherein each internal electrode of the pair of the internal electrodes has a two-dimensional shape including at least one of a curve and a chamfering straight line in each of four corner portions, the length of the at least one of the curve and the chamfering straight line in one corner portion of the one internal electrode of a pair of the internal electrodes is different from the length of the at least one of the curve and the chamfering straight line in the portion facing the corner portion and having a width gradually decreasing in one direction in the other internal electrode.

11. The laminated ceramic electronic component according to claim 10, wherein one of the corner portions is located in the end portion opposite to the lead portion in the internal electrode.

12. The laminated ceramic electronic component according to claim 10, wherein the length of at least one of the curve and the chamfering straight line in one corner portion of the other internal electrode is different from the length of at least one of the curve and the chamfering straight line in the portion facing the corner portion and having a width gradually decreasing in one direction in the one internal electrode.

13. The laminated ceramic electronic component according to claim 10, wherein the width of the portion having a width that gradually decreases in one direction decreases linearly at an angle of about 40 degrees to about 80 degrees.

14. The laminated ceramic electronic component according to claim 10, wherein the width of the portion having a width that gradually decreases in one direction decreases linearly at an angle of about 60 degrees to about 80 degrees.

15. The laminated ceramic electronic component according to claim 10, wherein the external electrode-side width in the portion having a width that gradually decreases in one direction is about two-thirds to about three-quarters the width of the internal electrode main portion.

* * * * *